(12) United States Patent
Bennett et al.

(10) Patent No.: US 8,516,952 B2
(45) Date of Patent: Aug. 27, 2013

(54) ROTISSERIE BROILER

(76) Inventors: Dale E. Bennett, Woodstock, GA (US);
Gerald Lingerfelt, Canton, GA (US);
Hollis Wiygul, Travelers Rest, SC (US)

( * ) Notice: Subject to any disclaimer, the term of this patent is extended or adjusted under 35 U.S.C. 154(b) by 574 days.

(21) Appl. No.: 12/783,522

(22) Filed: May 19, 2010

(65) Prior Publication Data

US 2011/0283893 A1 Nov. 24, 2011

(51) Int. Cl.
*A47J 37/04* (2006.01)
(52) U.S. Cl.
USPC ............................. 99/420; 99/419; 99/443 C
(58) Field of Classification Search
USPC ................. 99/420, 421 H, 419, 443 R, 443 C
See application file for complete search history.

(56) References Cited

U.S. PATENT DOCUMENTS

| | | | | |
|---|---|---|---|---|
| 1,208,335 A | * | 12/1916 | Lawrence | 126/369 |
| 2,138,813 A | * | 12/1938 | Bemis | 99/352 |
| 2,520,067 A | * | 8/1950 | Sagen | 99/420 |
| 3,338,156 A | * | 8/1967 | Angelos | 99/427 |
| 4,003,782 A | * | 1/1977 | Farrelly | 156/552 |
| 4,034,661 A | | 7/1977 | Boosalis et al. | |
| 4,156,383 A | * | 5/1979 | Maddox | 99/427 |
| 4,382,403 A | * | 5/1983 | Tokayer | 99/339 |
| 4,437,580 A | | 3/1984 | Ferrin | |
| 4,440,071 A | | 4/1984 | Boosalis et al. | |
| 5,517,005 A | * | 5/1996 | Westerberg et al. | 219/685 |
| 6,810,792 B1 | * | 11/2004 | Knight | 99/340 |
| 2009/0090248 A1 | * | 4/2009 | Backus et al. | 99/421 H |

* cited by examiner

*Primary Examiner* — Reginald L Alexander
(74) *Attorney, Agent, or Firm* — Crose Law LLC; Bradley D. Crose

(57) ABSTRACT

A rotisserie broiler for skewered food items is provided. In one embodiment, the rotisserie broiler includes a horizontal conveyor defining a horizontal path of travel between a skewer receiving area and a transfer channel, the horizontal conveyor having a parallel pair of feeder chains to endlessly convey at a same rate to the transfer channel and a vertical conveyor disposed perpendicular to the horizontal conveyor at the transfer channel and defining a vertical path of travel between the transfer channel and a dispenser, the vertical conveyor having a parallel pair of rotisserie chains to endlessly convey at the same rate from the transfer channel to the dispenser. The food items are placed into the rotisserie broiler on a conveyor in a generally horizontal plane and automatically picked up by a conveyor in a vertical plane to be broiled and rotated adjacent to heating elements and then dispersed.

19 Claims, 31 Drawing Sheets

ROTISSERIE BROILER

FIELD OF THE INVENTION

The technology described herein relates generally to devices for heating and dispensing food items. More specifically, this technology relates to a rotisserie broiler for heating and dispensing skewered food items, wherein the food items are placed into the rotisserie broiler on a conveyor in a generally horizontal plane and automatically picked up by a conveyor in a vertical plane to be broiled and rotated adjacent to heating elements and then dispersed.

BACKGROUND OF THE INVENTION

Automated heating, cooking, and dispensing devices and systems for food and beverage items are known in the art. By way of example, known devices can include conveyors to pass uncooked food by a heating and cooking element before being dispensed. There are many limitations and deficiencies with these known devices.

Related patents known in the art include the following: U.S. Pat. No. 4,034,661, issued to Boosalis et al. on Jul. 12, 1977, discloses an apparatus for heating and dispensing food articles. U.S. Pat. No. 4,437,580, issued to Ferrin on Mar. 20, 1984, discloses a dispenser for skewered foods. U.S. Pat. No. 4,440,071, issued to Boosalis, deceased et al. on Apr. 3, 1984, discloses a conveyor system for skewered foods.

The foregoing patent information reflects the state of the art of which the inventors are aware and is tendered with a view toward discharging the inventors' acknowledged duty of candor in disclosing information that may be pertinent to the patentability of the technology described herein. It is respectfully stipulated, however, that the foregoing patent and other information do not teach or render obvious, singly or when considered in combination, the inventors' claimed invention.

BRIEF SUMMARY OF THE INVENTION

In various exemplary embodiments, the technology described herein provides a device, system, and associated methods for a rotisserie broiler for heating and dispensing skewered food items. The food items are placed into the rotisserie broiler on a conveyor in a generally horizontal plane and automatically picked up by a conveyor in a vertical plane to be broiled and rotated adjacent to heating elements and then dispersed.

In one exemplary embodiment, the technology described herein provides a heating and cooking apparatus for skewered food items. The apparatus includes: a horizontal conveyor assembly defining a horizontal path of travel between a skewer receiving area and a transfer channel, the horizontal conveyor assembly having a parallel pair of feeder chain assemblies to endlessly convey at a same rate to the transfer channel; and a vertical conveyor assembly disposed perpendicular to the horizontal conveyor assembly at the transfer channel and defining a vertical path of travel between the transfer channel and a dispenser, the vertical conveyor assembly having a parallel pair of rotisserie chain assemblies to endlessly convey at the same rate from the transfer channel to the dispenser.

The apparatus also can include a removable feeder pan assembly into which the horizontal conveyor assembly is disposed, the feeder pan assembly having a base pan and configured for operative removal and insertion from and into the heating and cooking apparatus, the feeder pan assembly having a curved chute defining the transfer channel and into which a skewered food item is transferred from the horizontal conveyor assembly to the vertical conveyor assembly.

The apparatus further can include a pair of horizontal conveyor axles, each axle having a gear assembly at each end, the axles and gear assemblies configured to extend the parallel pair of feeder chain assemblies in a taut circuitous path between the skewer receiving area and the transfer channel.

The apparatus also can include a pair of vertical conveyor axles, each axle having a gear assembly at each end, the axles and gear assemblies configured to extend the parallel pair of rotisserie chain assemblies in a taut circuitous path between the transfer channel and the dispenser.

The apparatus further can include at least one rocker arm coupled to at least one vertical conveyor axle and at least one tension spring coupled to the rocker arm. The at least one rocker arm and the at least one tension spring are configured to maintain the rotisserie chain assemblies in a taut circuitous path between the transfer channel and the dispenser.

The apparatus also can include at least one serrated bar disposed vertically in the heating and cooking apparatus directly adjacent to the vertical conveyor assembly and the vertical path of travel between the transfer channel and the dispenser. The at least one serrated bar is adapted to rotate a skewer pushed against it by the rotisserie chain assemblies while in transit on the vertical path to the dispenser.

The apparatus still further can include a tension bar assembly disposed vertically in the rotisserie broiler directly adjacent to the rotisserie chain assemblies, the tension bar assembly having a plurality of free-floating tension plates each with a tension spring to push each tension plate against a back side of each rotisserie chain assembly to maintain a tension between a skewer on the vertical path and a serrated bar to rotate the skewer.

The apparatus also can include at least one heating element disposed with the heating and cooking apparatus adjacent to the vertical path of travel and the vertical conveyor assembly to heat and cook a plurality of skewered food items. In at least one embodiment, the heating element is a cal-rod heating element. It at least one alternative embodiment, the heating element is a quartz bulb.

The apparatus further can include a ventilation system to keep the plurality of exterior walls of the heating and cooking apparatus cool and to provide convection cooking, the ventilation system having at least one door air circulation vent, at least one side wall air circulation vent, and at least one back wall evacuation vent.

The apparatus still further can include a plurality of bar plates having lift arms disposed upon each rotisserie chain assembly to receive and lift an end of a skewer, wherein a first bar plate and lift arm on a left rotisserie chain assembly is symmetric in placement with a second bar plate and lift arm on a right rotisserie chain assembly. It at least one embodiment, each bar plate having a lift arm is defined with the lift arm at a generally ninety degree angle to a chain of the rotisserie chain assembly.

In another exemplary embodiment, the technology described herein provides a rotisserie broiler. The rotisserie broiler includes: a horizontal conveyor assembly defining a horizontal path of travel between a skewer receiving area and a transfer channel, the horizontal conveyor assembly having a parallel pair of feeder chain assemblies to endlessly convey at a same rate to the transfer channel; and a removable feeder pan assembly into which the horizontal conveyor assembly is disposed, the feeder pan assembly having a base pan and configured for operative removal and insertion from and into the rotisserie broiler.

The rotisserie broiler also can include: a vertical conveyor assembly disposed perpendicular to the horizontal conveyor assembly at the transfer channel and defining a vertical path of travel between the transfer channel and a dispenser, the vertical conveyor assembly having a parallel pair of rotisserie chain assemblies to endlessly convey at the same rate from the transfer channel to the dispenser; a curved chute defined within the feeder pan assembly into which a skewered food item is transferred from the horizontal conveyor assembly to the vertical conveyor assembly; and at least one heating element disposed with the heating and cooking apparatus adjacent to the vertical path of travel and the vertical conveyor assembly to heat and cook a plurality of skewered food items.

The rotisserie broiler further can include: a first pair of axles, each axle having a gear assembly at each end, the axles and gear assemblies configured to extend the parallel pair of rotisserie chain assemblies in a taut circuitous path between the transfer channel and the dispenser; and a second pair of axles, each axle having a gear assembly at each end, the axles and gear assemblies configured to extend the parallel pair of feeder chain assemblies in a taut circuitous path between the skewer receiving area and the transfer channel.

The rotisserie broiler also can include: a ventilation system to keep cool the plurality of exterior walls of the rotisserie broiler and to provide convection cooking, the ventilation system having at least one door air circulation vent, at least one side wall air circulation vent, and at least one back wall evacuation vent; and a plurality of bar plates having lift arms disposed upon each rotisserie chain assembly to receive and lift an end of a skewer, wherein a first bar plate and lift arm on a left rotisserie chain assembly is symmetric in placement with a second bar plate and lift arm on a right rotisserie chain assembly, wherein each bar plate having a lift arm is defined with the lift arm at a generally ninety degree angle to the rotisserie chain assembly.

The rotisserie broiler further can include: a tension bar assembly disposed vertically in the rotisserie broiler directly adjacent to the rotisserie chain assemblies, the tension bar assembly having a plurality of free-floating tension plates each with a tension spring to push each tension plate against a back side of each rotisserie chain assembly to maintain a tension between a skewer on the vertical path and a serrated bar to rotate the skewer.

The rotisserie broiler still further can include: at least one rocker arm coupled to at least one axle and at least one tension spring coupled to the rocker arm. The at least one rocker arm and the at least one tension spring are configured to maintain the rotisserie chain assemblies in a taut circuitous path between the transfer channel and the dispenser.

In another exemplary embodiment, the technology described herein provides a rotisserie broiler for heating and cooking skewered food items. The rotisserie broiler includes: a horizontal conveyor assembly defining a horizontal path of travel between a skewer receiving area and a transfer channel, the horizontal conveyor assembly having a parallel pair of feeder chain assemblies to endlessly convey at a same rate to the transfer channel; a removable feeder pan assembly into which the horizontal conveyor assembly is disposed, the feeder pan assembly having a base pan and configured for operative removal and insertion from and into the rotisserie broiler; a vertical conveyor assembly disposed perpendicular to the horizontal conveyor assembly at the transfer channel and defining a vertical path of travel between the transfer channel and a dispenser, the vertical conveyor assembly having a parallel pair of rotisserie chain assemblies to endlessly convey at the same rate from the transfer channel to the dispenser; a curved chute defined within the feeder pan assembly into which a skewered food item is transferred from the horizontal conveyor assembly to the vertical conveyor assembly; at least one heating element disposed with the heating and cooking apparatus adjacent to the vertical path of travel and the vertical conveyor assembly to heat and cook a plurality of skewered food items; a first pair of axles, each axle having a gear assembly at each end, the axles and gear assemblies configured to extend the parallel pair of rotisserie chain assemblies in a taut circuitous path between the transfer channel and the dispenser; a second pair of axles, each axle having a gear assembly at each end, the axles and gear assemblies configured to extend the parallel pair of feeder chain assemblies in a taut circuitous path between the skewer receiving area and the transfer channel; a ventilation system to keep cool the plurality of exterior walls of the rotisserie broiler and to provide convection cooking, the ventilation system having at least one door air circulation vent, at least one side wall air circulation vent, and at least one back wall evacuation vent; a plurality of bar plates having lift arms disposed upon each rotisserie chain assembly to receive and lift an end of a skewer, wherein a first bar plate and lift arm on a left rotisserie chain assembly is symmetric in placement with a second bar plate and lift arm on a right rotisserie chain assembly, wherein each bar plate having a lift arm is defined with the lift arm at a generally ninety degree angle to the rotisserie chain assembly; a tension bar assembly disposed vertically in the rotisserie broiler directly adjacent to the rotisserie chain assemblies, the tension bar assembly having a plurality of free-floating tension plates each with a tension spring to push each tension plate against a back side of each rotisserie chain assembly to maintain a tension between a skewer on the vertical path and a serrated bar to rotate the skewer; and at least one rocker arm coupled to at least one axle having at least one tension spring coupled to the rocker arm, wherein the at least one rocker arm and the at least one tension spring are configured to maintain the rotisserie chain assemblies in a taut circuitous path between the transfer channel and the dispenser.

There has thus been outlined, rather broadly, the more important features of the technology in order that the detailed description thereof that follows may be better understood, and in order that the present contribution to the art may be better appreciated. There are additional features of the technology that will be described hereinafter and which will form the subject matter of the claims appended hereto. In this respect, before explaining at least one embodiment of the technology in detail, it is to be understood that the invention is not limited in its application to the details of construction and to the arrangements of the components set forth in the following description or illustrated in the drawings. The technology described herein is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the technology described herein.

Further objects and advantages of the technology described herein will be apparent from the following detailed description of a presently preferred embodiment which is illustrated schematically in the accompanying drawings.

BRIEF DESCRIPTION OF THE DRAWINGS

The technology described herein is illustrated with reference to the various drawings, in which like reference numbers denote like device components and/or method steps, respectively, and in which.

DETAILED DESCRIPTION OF THE INVENTION

Figure 1:
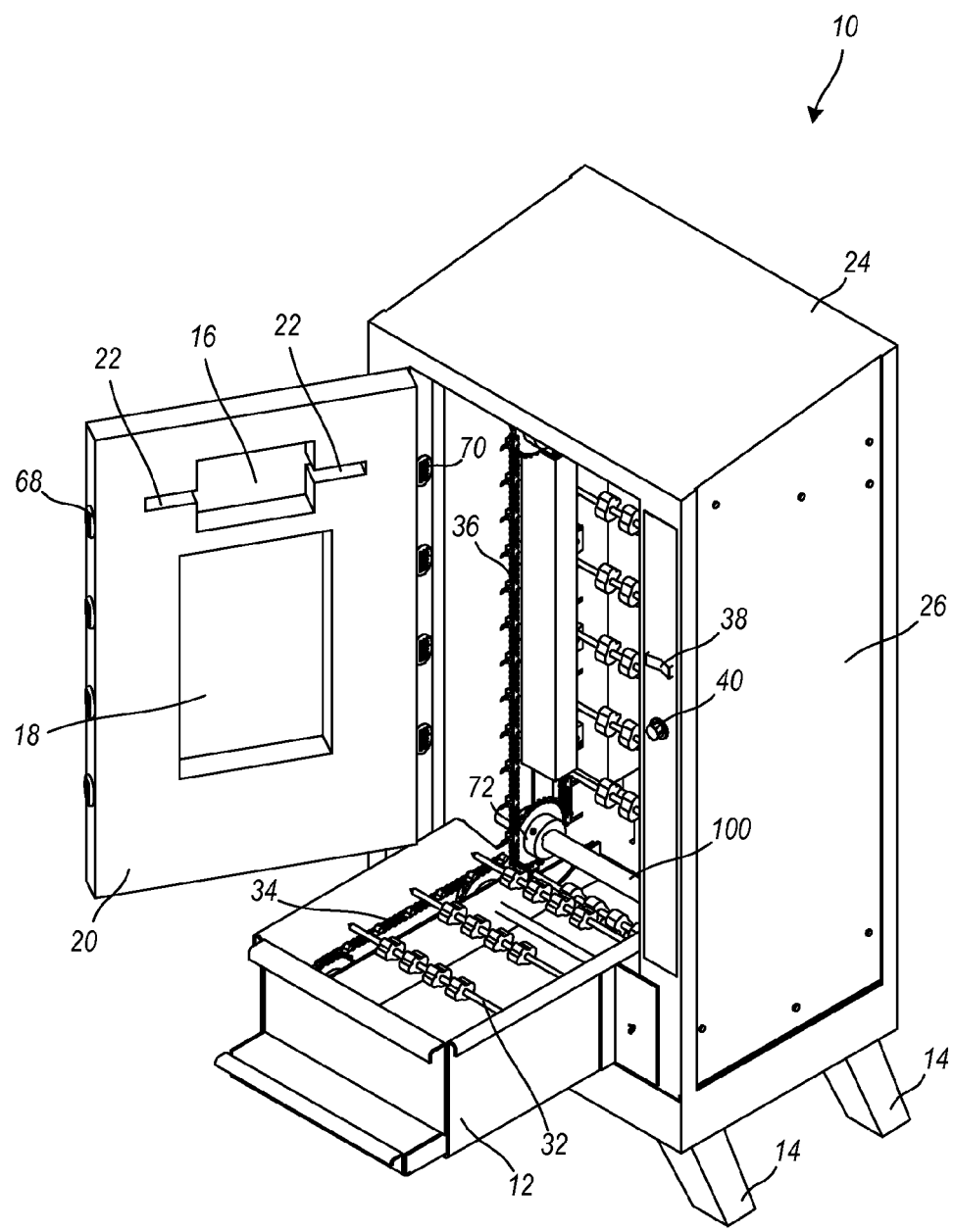
FIG. 1 is a front perspective view of a rotisserie broiler, illustrating, in particular, food items placed into a feeder pan of the rotisserie broiler on a conveyor in a generally horizontal plane and automatically picked up by a conveyor in a vertical plane to be broiled and rotated adjacent to heating elements and then dispersed, according to an embodiment of the technology described herein.
Figure 2:
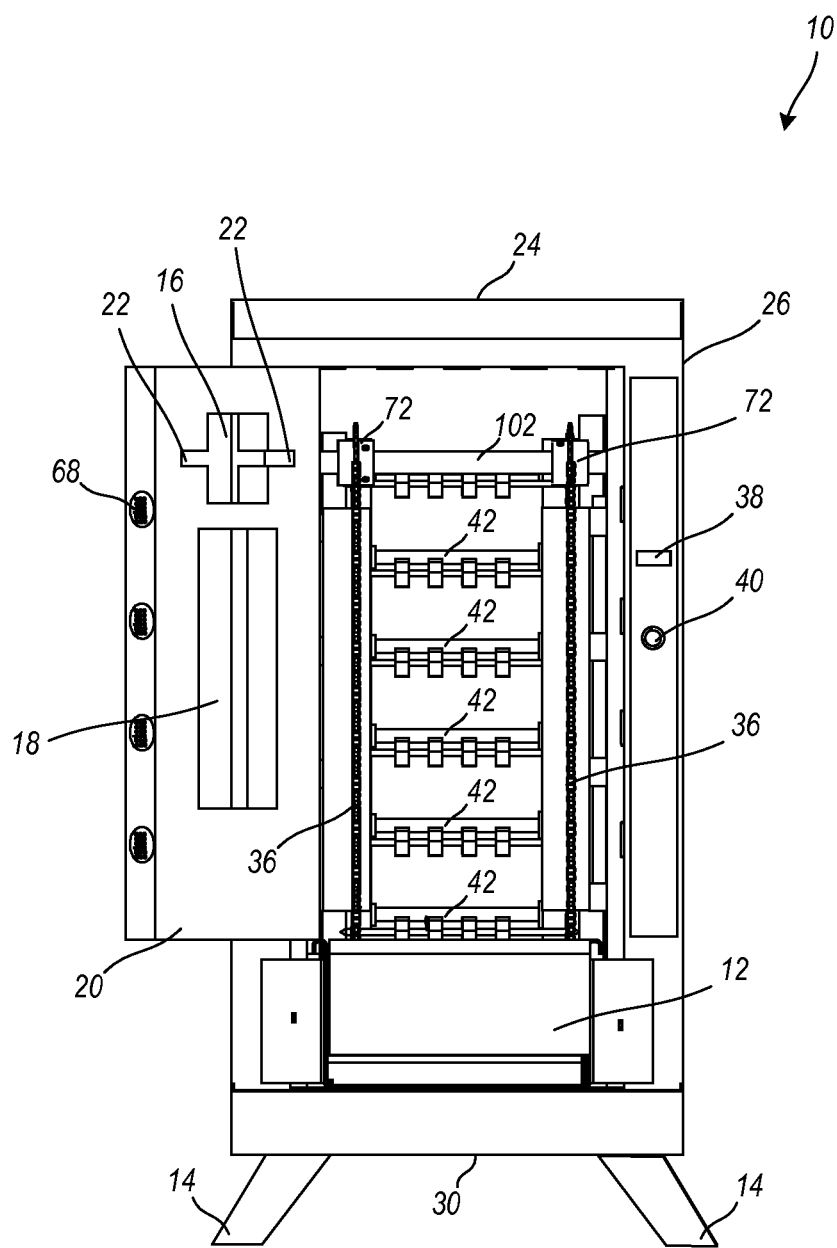
FIG. 2 is a front planar view of the rotisserie broiler shown in FIG. 1.
Figure 3:
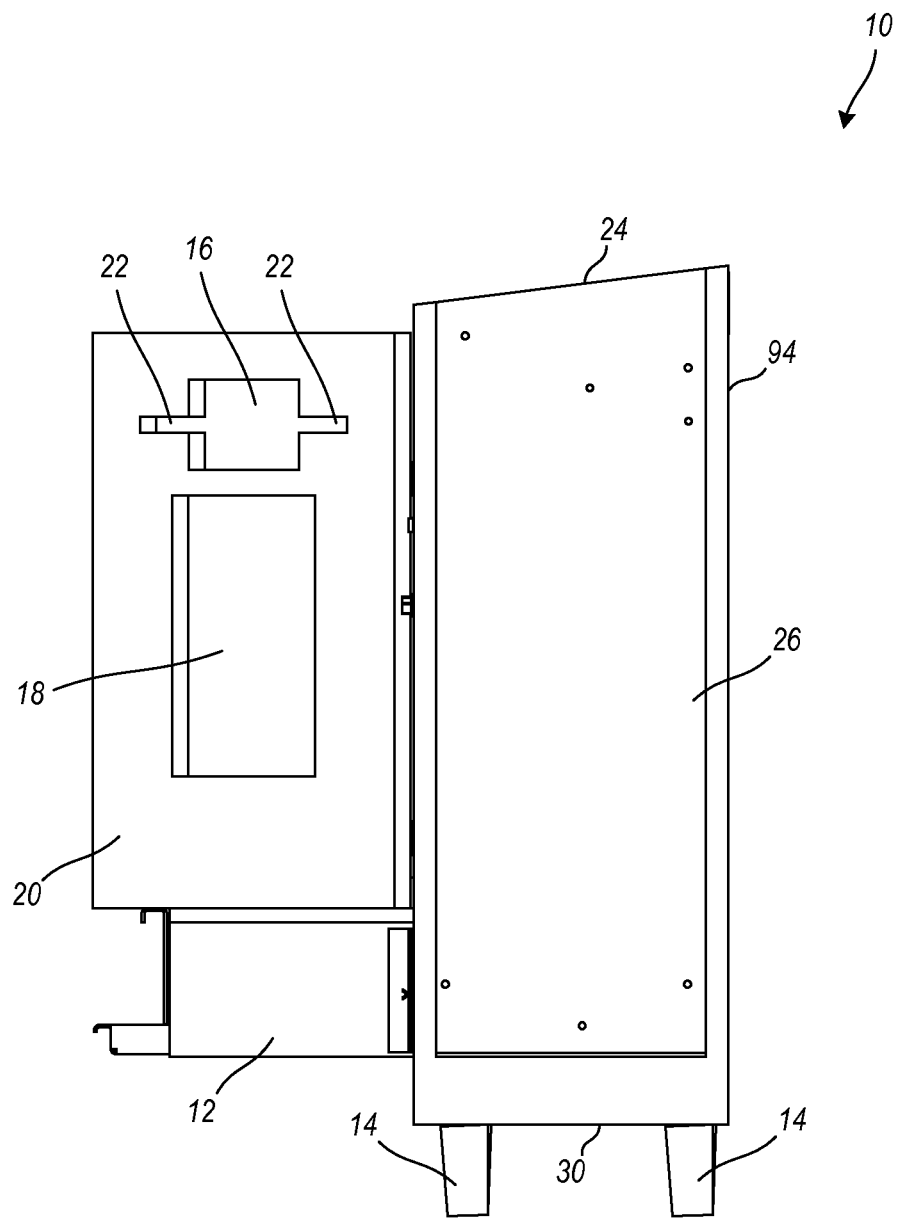
FIG. 3 is a side planar view of the rotisserie broiler shown in FIG. 1.
Figure 4:
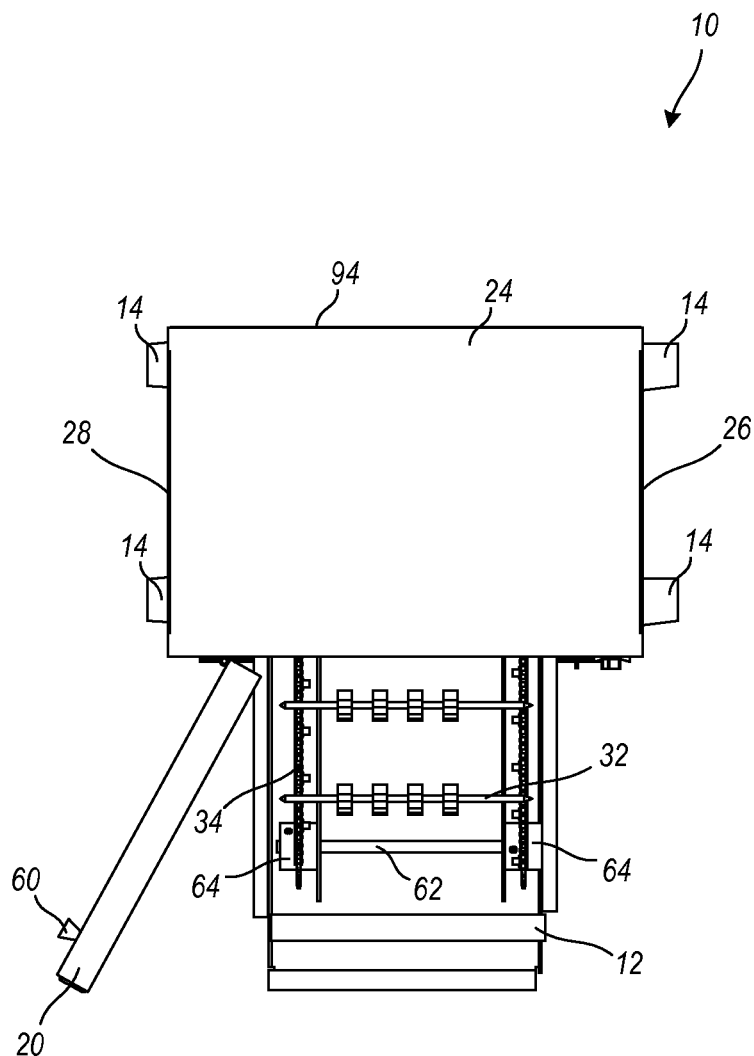
FIG. 4 is a top planar view of the rotisserie broiler shown in FIG. 1.
Figure 5:
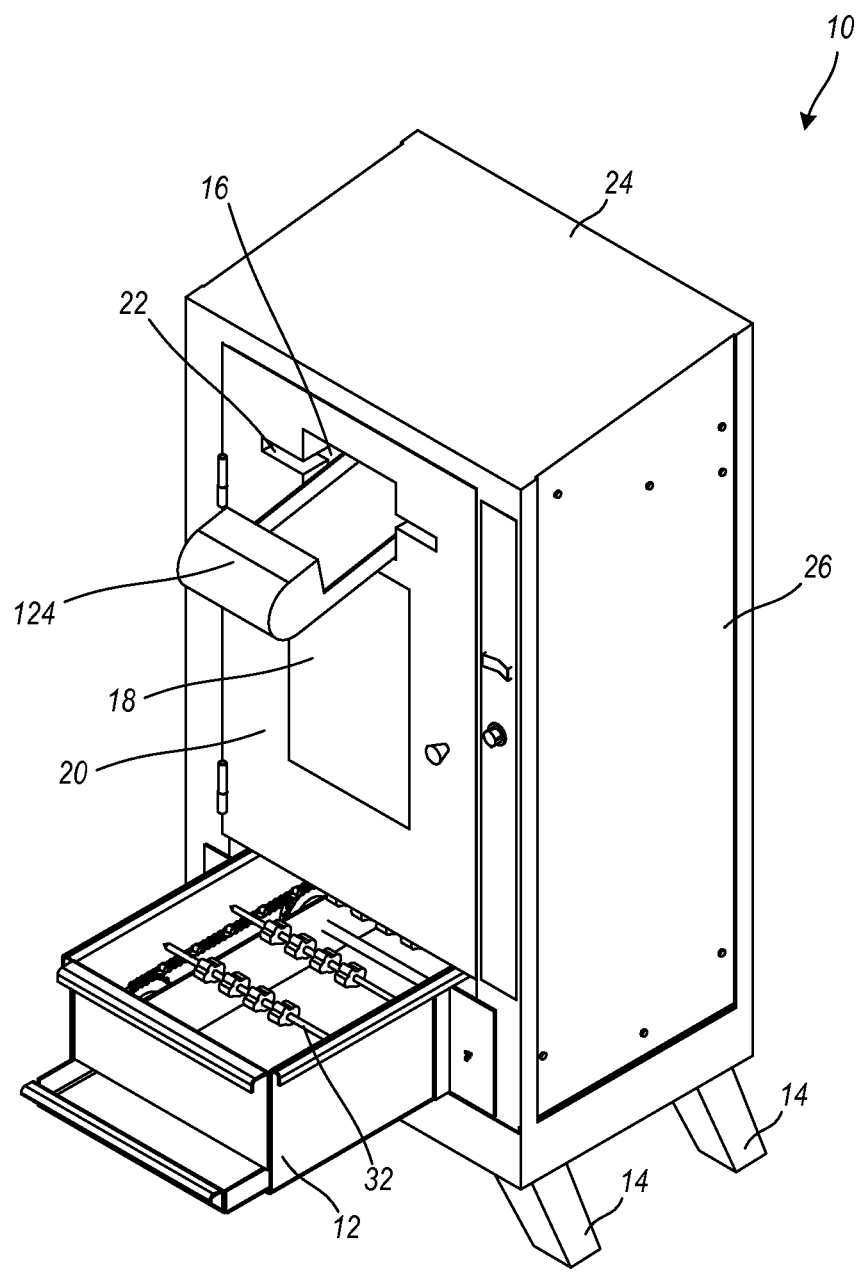
FIG. 5 is front perspective view of the rotisserie broiler depicted in FIG. 1, illustrating, in particular, the dispenser chute, according to an embodiment of the technology described herein.
Figure 6:
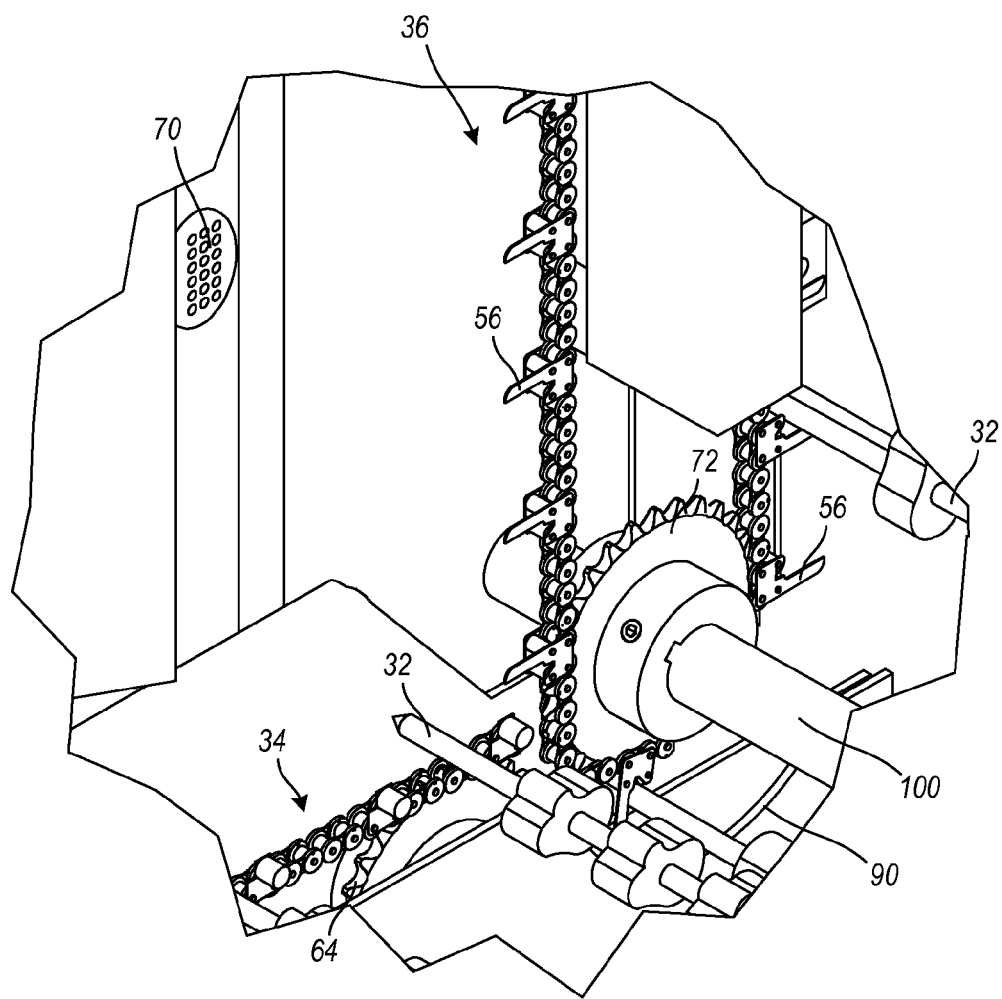
FIG. 6 is a close-up perspective view the rotisserie broiler depicted in FIG. 1, illustrating, in particular, the transition of a skewer exiting the generally horizontal conveyor to be picked up by the vertical conveyor, according to an embodiment of the technology described herein.

Before describing the disclosed embodiments of this technology in detail, it is to be understood that the technology is not limited in its application to the details of the particular arrangement shown here since the technology described is capable of other embodiments. Also, the terminology used herein is for the purpose of description and not of limitation.

In various exemplary embodiments, the technology described herein provides a device, system, and associated methods for a rotisserie broiler for heating and dispensing skewered food items. The food items are placed into the rotisserie broiler on a conveyor in a generally horizontal plane and automatically picked up by a conveyor in a vertical plane to be broiled and rotated adjacent to heating elements and then dispersed.

Referring now to the Figures a rotisserie broiler 10 is shown. As depicted in FIGS. 1 through 5, the rotisserie broiler 10 includes a housing defined by a rear panel 94, left side panel 28, right side panel 26, top panel 24, base panel 30, and door 20 enclosures. These housing elements 94, 28, 26, 24, 30, 20 define a generally rectangular upright rotisserie broiler container for heating and dispensing skewered food items 32 in a dual conveyor system. The housing elements are not thin panels, but rather enclosures and walls to contain vents, electrical controls, drive motors, rocker arm assemblies, spring assemblies, fans, insulation, and the like. Further, each of these housing elements can be opened for access to internal components located within the panel members 94, 28, 26, 24, 30 and door member 20.

The rotisserie broiler 10 includes at least four legs 14. The legs 14 are attached to the base panel 30 and raise the rotisserie broiler 10 above a surface beneath upon which the rotisserie broiler 10 is supported. The legs 14 provide an area beneath the rotisserie broiler 10 for ventilation and uninhibited operation of the fans located in base panel 30. The legs 14 can be manufactured with or coated with a non-slip material to provide a stable footing to the rotisserie broiler 10.

The door 20 of the rotisserie broiler 10 includes a window 18. The window 18 is manufactured of a glass material sufficient to withstand the heat from the rotisserie broiler 10 and provide for viewing of the heating and dispensing of the skewered food items 32 as they are conveyed through the rotisserie broiler 10.

The door 20 of the rotisserie broiler 10 includes a dispenser window 16 and removable dispenser chute 124. The dispenser window 16 allows for the passage of the skewered food items 32 from the rotisserie broiler 10 to the dispenser chute 124 once they have been heated and cooked. An operator can pick up the heated and cooked foot items from the dispenser chute 124. The dispenser window 16 is defined with end channels 22 to allow for passage of the elongated skewers 32. As such the dispenser window 16 and end channels 22 are defined such that skewered food items 32 of a variety of sizes can be dispensed, while minimizing open access to the rotisserie broiler 10. The door 20 is further defined by handle 60 with which to operatively open and close the door 20 to access the interior of the rotisserie broiler 10.

The rotisserie broiler 10 includes multiple controls. One control is a power switch 38. As depicted in the Figures, the power switch 38 is a rocker switch; however, alternative switches can be utilized to control power to the rotisserie broiler 10. Another control provided is a speed control 40. As depicted the speed control 40 is a dial control. The speed control 40 provides an operator with the ability to selectively change the rate at which the skewered food items are passing through the rotisserie broiler 10, and thus how long the skewered food items 32 rotate before the heating elements to heat and cook. In various embodiments, additional controls are utilized. By way of example, controls and monitors are used for temperature and time. As will be apparent to one of ordinary skill in the art, upon reading this disclosure, a variety of controls, sensors, and monitors can be utilized in various embodiments.

Both commercial and home-use models of the rotisserie broiler 10 are provided. In a commercial embodiment, the rotisserie broiler 10 is manufactured of commercial grade materials and ratings for use in a commercial kitchen or the like. By way of example, a commercial version of the rotisserie broiler 10 is adapted for power at 220V. Additionally, the commercial version is adapted for large capacities of food items. In an alternative embodiment, the rotisserie broiler 10 is adapted for home use. By way of example, a home use version is adapted for power at 110V and is configured to handle smaller quantities of skewered food items 32.

The rotisserie broiler 10 includes a horizontal conveyor assembly defining a horizontal path of travel between a skewer receiving area, such as a feeder pan 12, and a transfer channel 90. The horizontal conveyor assembly has a parallel pair of feeder chain assemblies 34 to endlessly convey skewered food items 32 at a same rate to the transfer channel 90.

A pair of horizontal conveyor axles 62, 66 is utilized to extend the parallel pair of feeder chain assemblies 34 in a taut circuitous path between the skewer receiving area and the transfer channel 90. The pair of horizontal conveyor axles includes front axle 62 and rear axle 66, each axle having a gear assembly 64 at each end to support and turn the feeder chain assemblies 34. In use skewered food items 32 are placed into the rotisserie broiler 10 in a manner wherein opposing skewer ends each are placed on opposing feeder chain assemblies 34. The skewered food items 32 are then conveyed horizontally to the transfer channel 90 for pick up by the rotisserie chain assemblies 36 in the vertical conveyor assembly. The axles and gear assemblies can be manufactured of stainless steel materials.

The rotisserie broiler 10 includes a vertical conveyor assembly disposed perpendicular to the horizontal conveyor assembly at the transfer channel 90 and defining a vertical path of travel between the transfer channel 90 and a dispenser assembly 16. The vertical conveyor assembly has a parallel pair of rotisserie chain assemblies 36 to endlessly convey skewered food items 32 at the same rate from the transfer channel 90 to the dispenser 16.

A pair of vertical conveyor axles 100, 102 is utilized to extend the parallel pair of rotisserie chain assemblies 36 in a taut circuitous path between the transfer channel 90 and the dispenser 16. The pair of vertical conveyor axles 100, 102 includes lower axle 100 and upper axle 102, each axle having a gear assembly 72 at each end to turn the rotisserie chain assemblies 36. In use skewered food items 32 are picked up in the transfer channel 90 by the rotisserie chain assemblies 36 in a manner wherein opposing skewer ends each are placed on opposing rotisserie chain assemblies 36. The rotisserie chain assemblies 36 rotate at the exact same rate to ensure each end of the skewered food items 32 travels at the same rate. The axles and gear assemblies can be manufactured of stainless steel materials.

Figure 7:
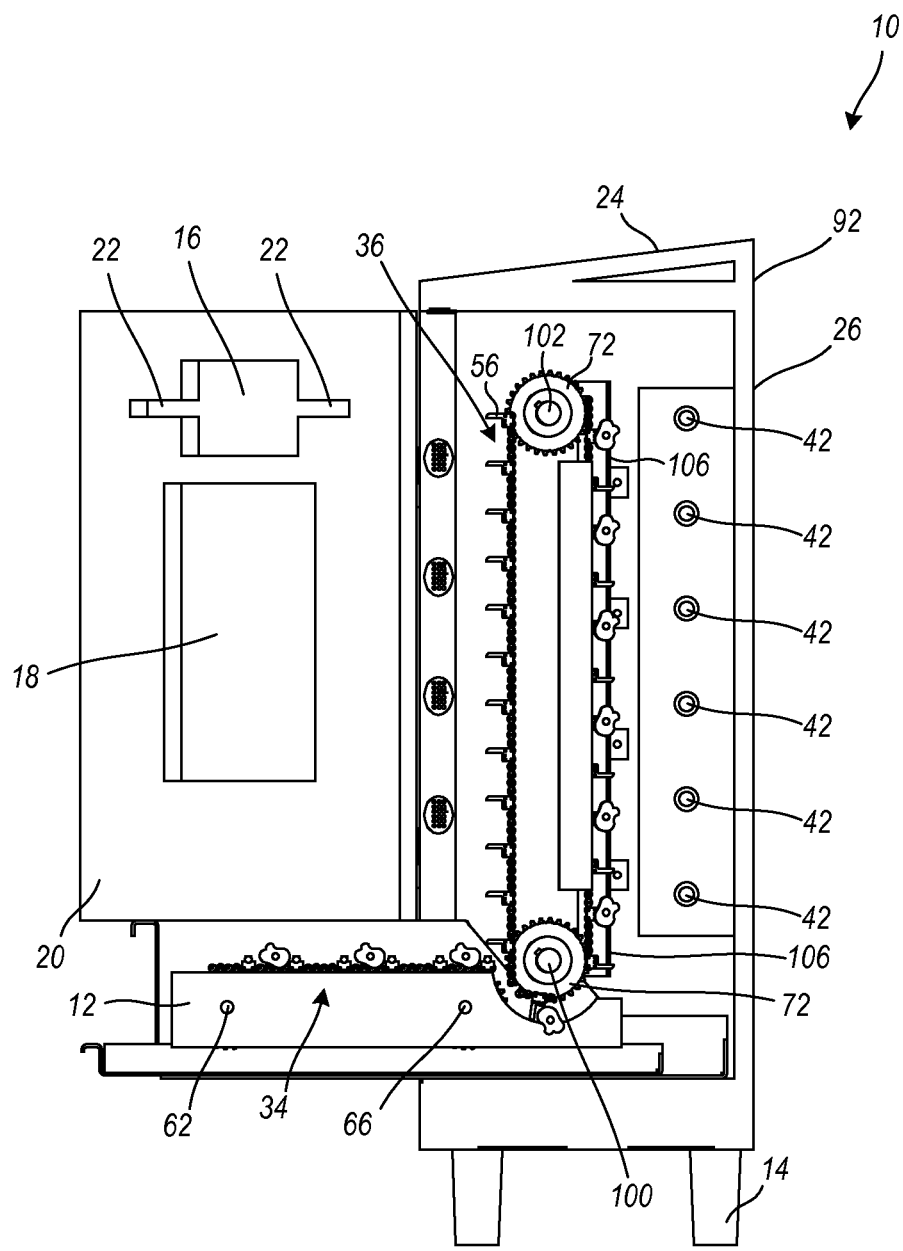
FIG. 7 is a side planar cross-sectional view of the rotisserie broiler depicted in FIG. 1, illustrating, in particular, the horizontal and vertical skewer conveyors, according to an embodiment of the technology described herein.
Figure 8:
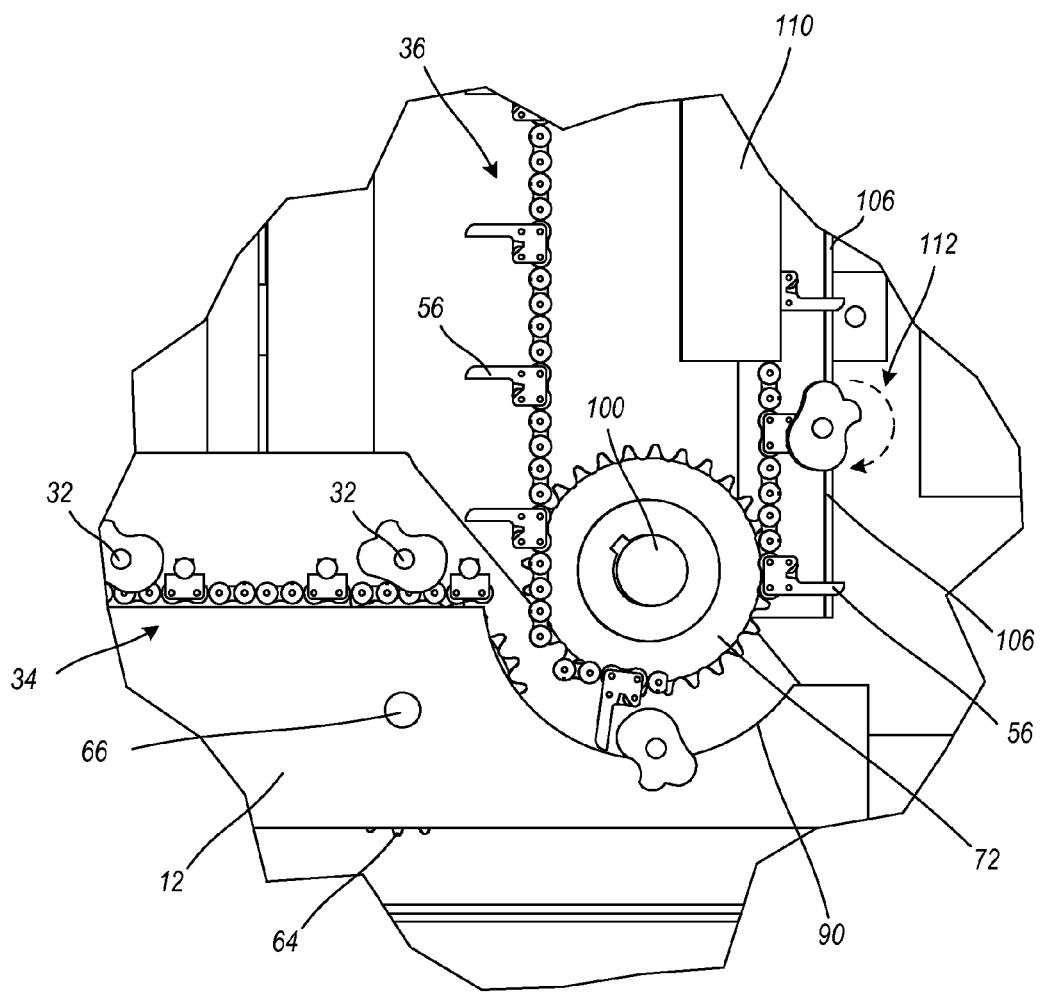
FIG. 8 is a close-up side view the rotisserie broiler depicted in FIG. 1, illustrating, in particular, the transition of a skewer exiting the generally horizontal conveyor to be picked up by the vertical conveyor, according to an embodiment of the technology described herein.

The skewered food items 32 are not only conveyed on the rotisserie chain assemblies 36, but also the skewered food items 32 are each rotated in rotisserie fashion before a multiplicity of heating elements 42. The heating elements can vary in number and type. By way of example, in one embodiment the heating elements 42 are cal-rod heating elements. In an alternative embodiment, the heating elements 42 are quartz bulbs. The ends of the skewers of the skewered food items 32 are pressed against a serrated bar 106 with a tension. The serrated bar 106 is placed vertically in the rotisserie broiler 10 directly adjacent to the vertical conveyor assembly and the vertical path of travel between the transfer channel 90 and the dispenser 16. In use, a serrated bar 106 is placed on each side of the vertical conveyor assembly adjacent to each rotisserie chain assembly 36. The tension on each rotisserie chain assembly 36 to the skewer and, thereby, to each serrated bar 106 is maintained by a tension bar assembly, discussed in detail subsequently. The tension placed on the skewer against each serrated bar 106 causes it rotate, for example, in direction 112, as depicted specifically in FIG. 7. This rotation provides a rotisserie effect to each skewered food item 32 and provides for evenly heated and cooked food items.

Figure 9:
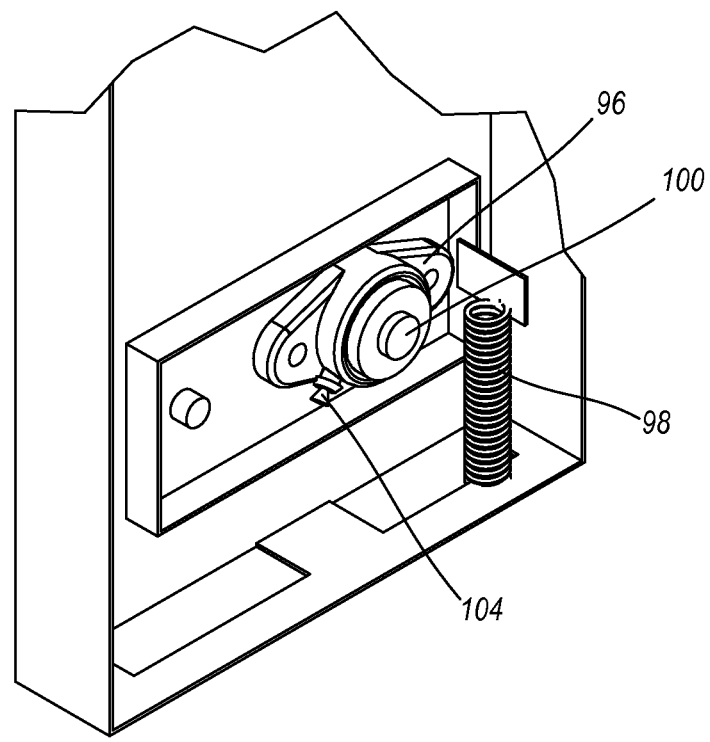
FIG. 9 is a close-up view of the rocker arm and tension spring utilized to maintain the main chain assembly (vertical conveyor) in a taut position, according to an embodiment of the technology described herein.
Figure 10:
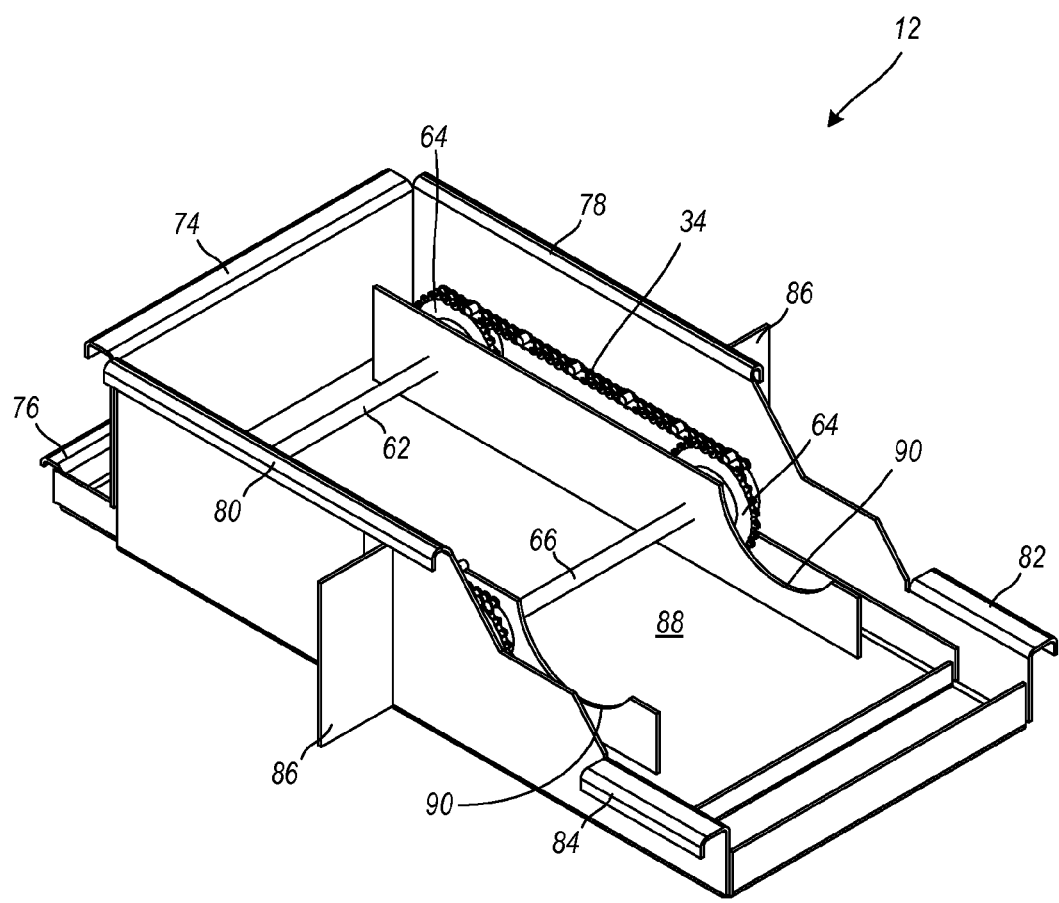
FIG. 10 is a front perspective view of a feeder pan, according to an embodiment of the technology described herein.
Figure 11:
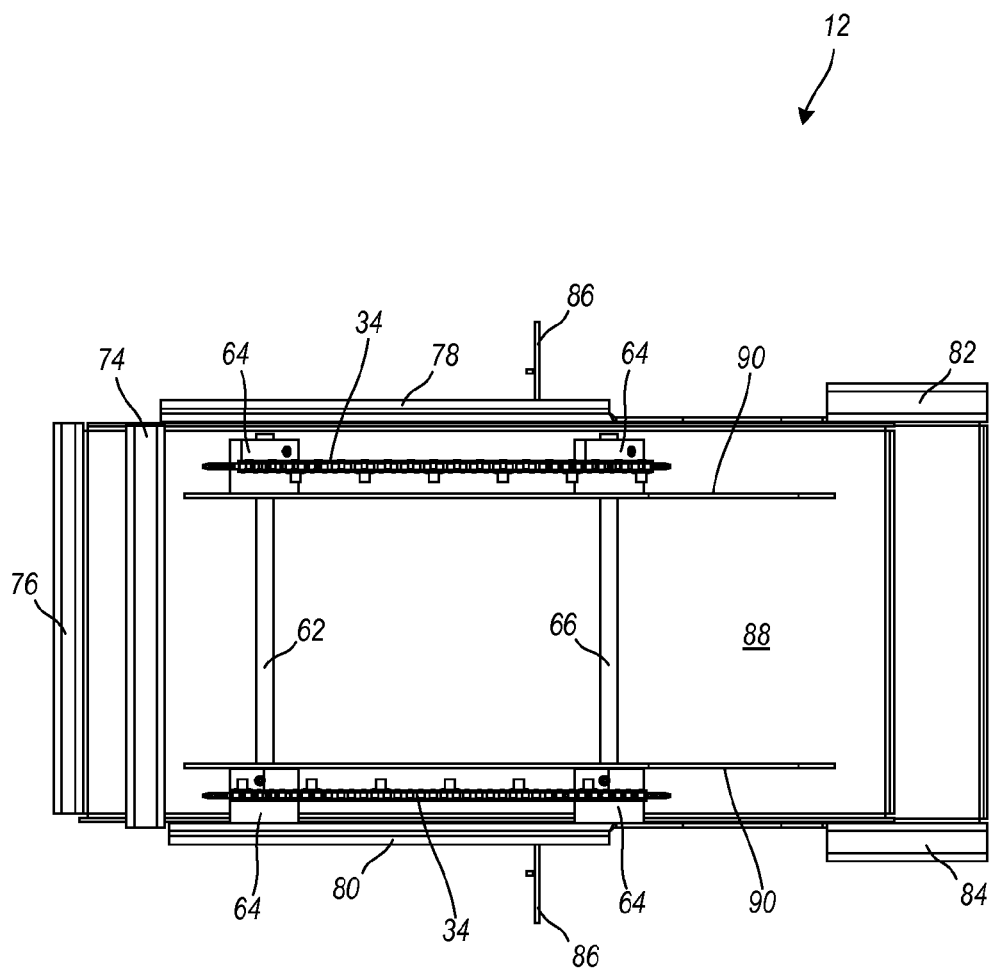
FIG. 11 is a top planar view of the feeder pan shown in FIG. 10.
Figure 12:
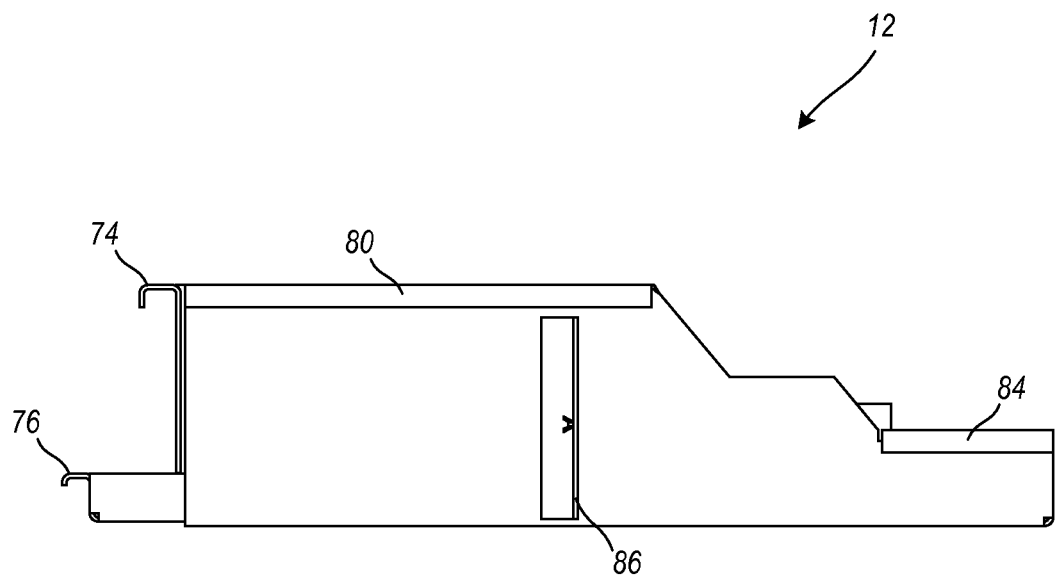
FIG. 12 is a side planar view of the feeder pan shown in FIG. 10.
Figure 13:
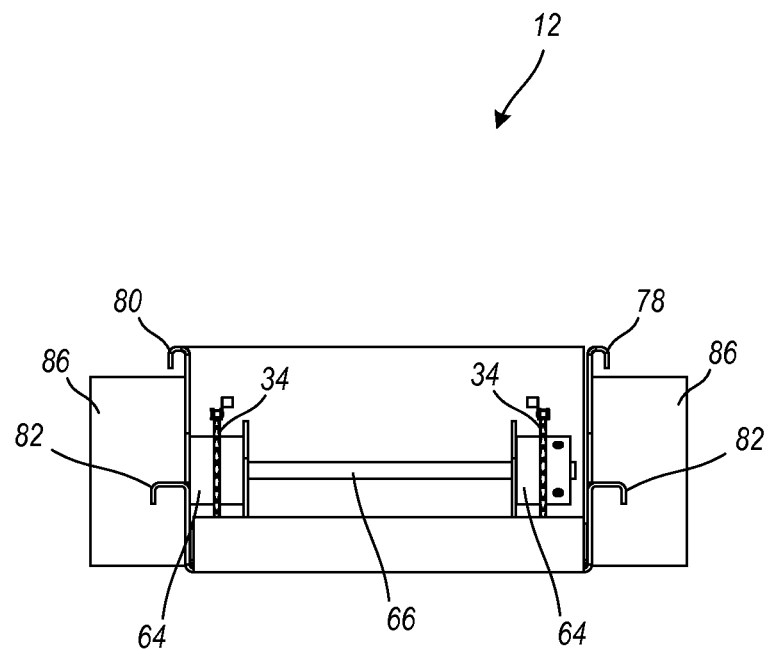
FIG. 13 is a front planar view of the feeder pan shown in FIG. 10.
Figure 14:
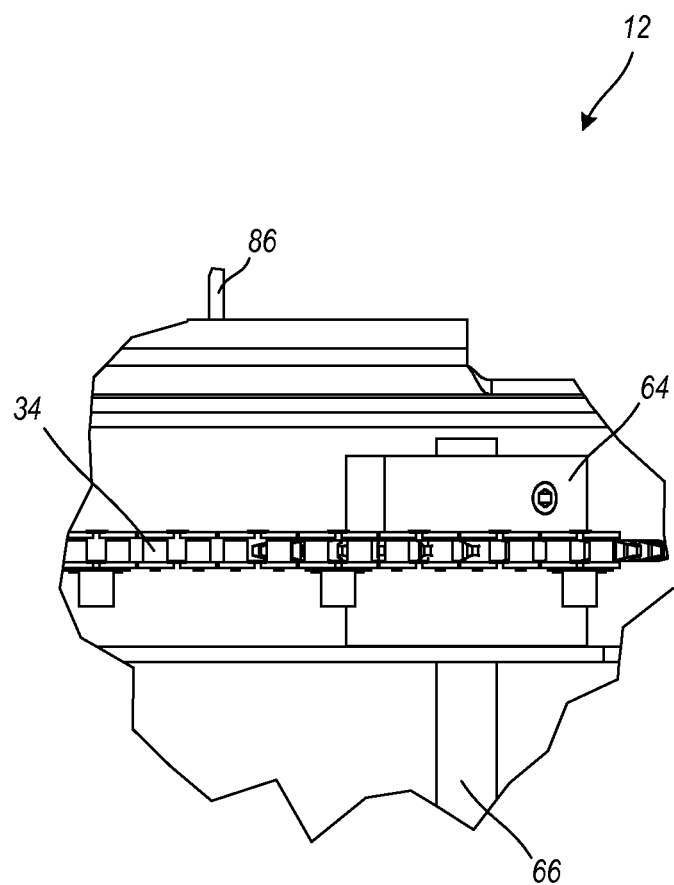
FIG. 14 is a close-up top view of the conveyor chain assembly in the feeder pan depicted in FIG. 10.
Figure 15:
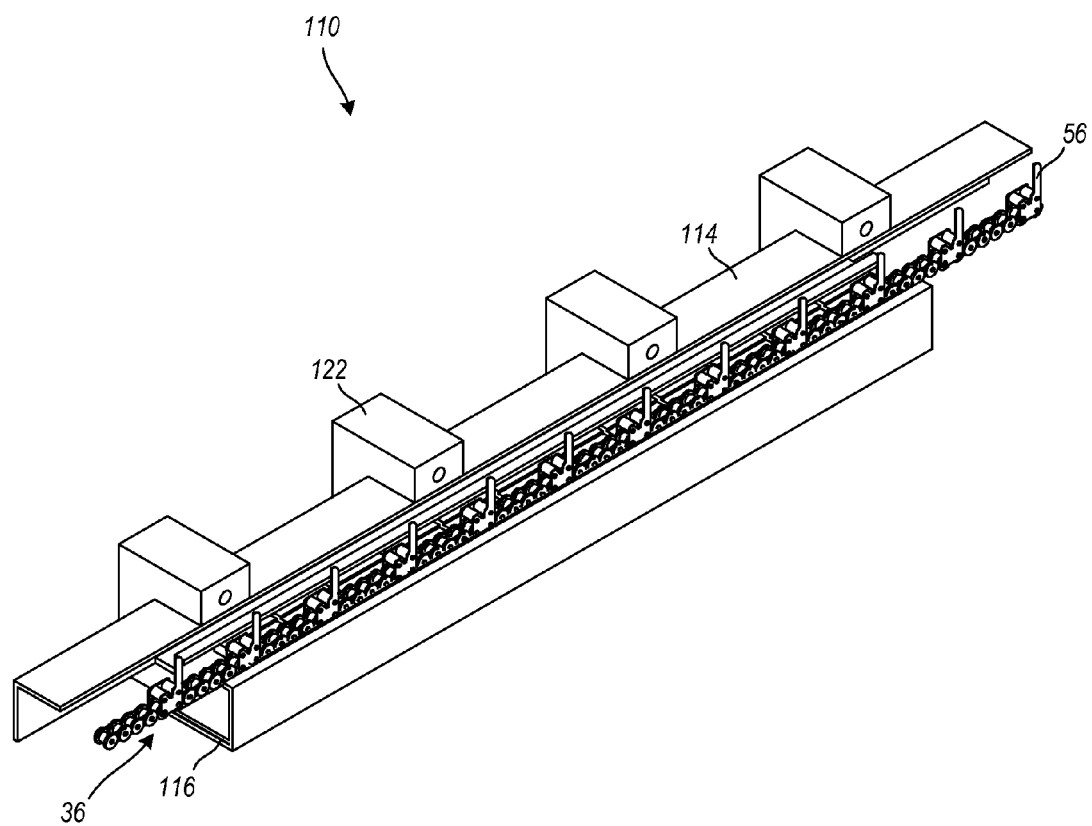
FIG. 15 is a front perspective view of a broiler conveyor chain assembly, according to an embodiment of the technology described herein.
Figure 16:
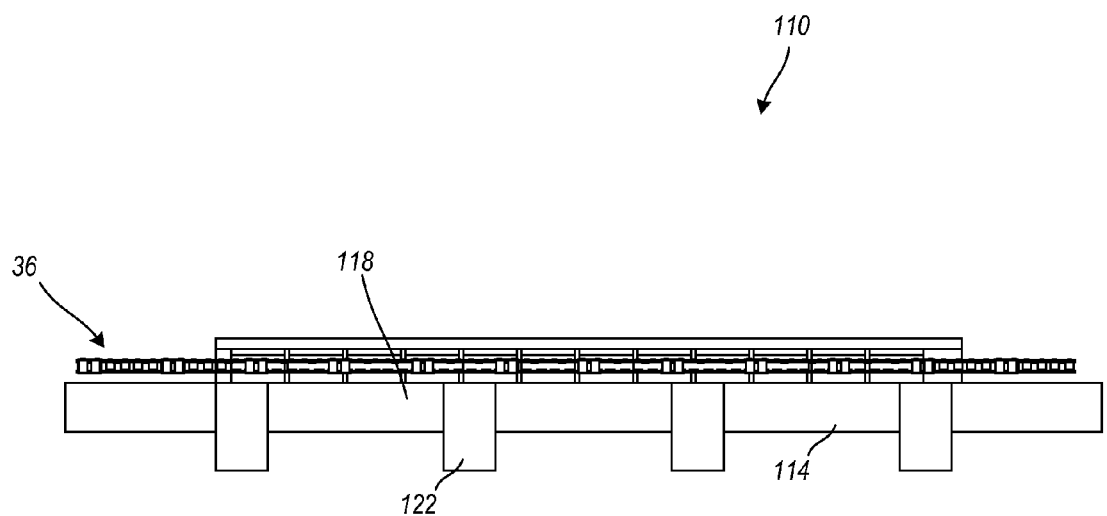
FIG. 16 is a front planar view of the broiler conveyor chain assembly depicted in FIG. 15.
Figure 17:
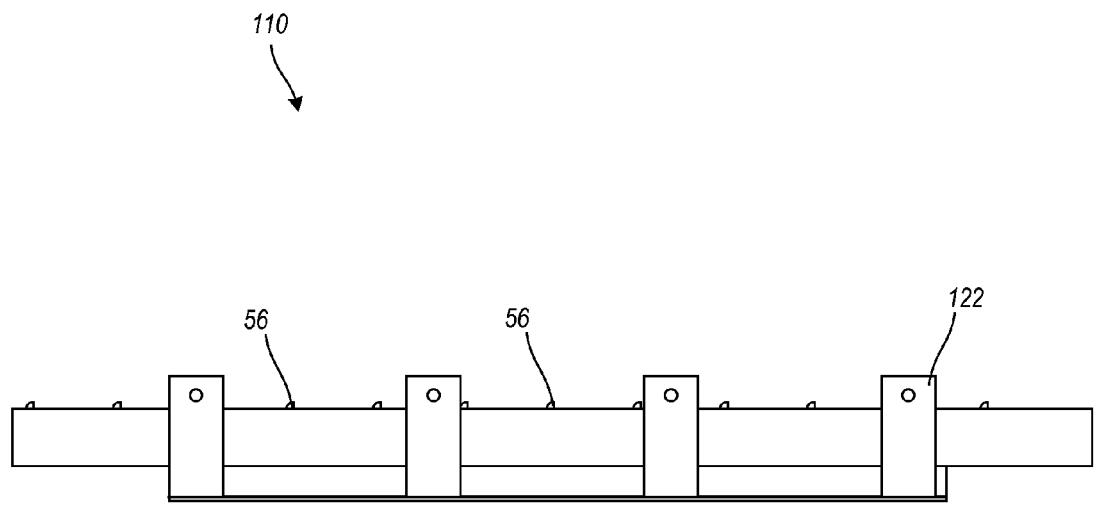
FIG. 17 is a side planar view of the broiler conveyor chain assembly depicted in FIG. 15.
Figure 18:
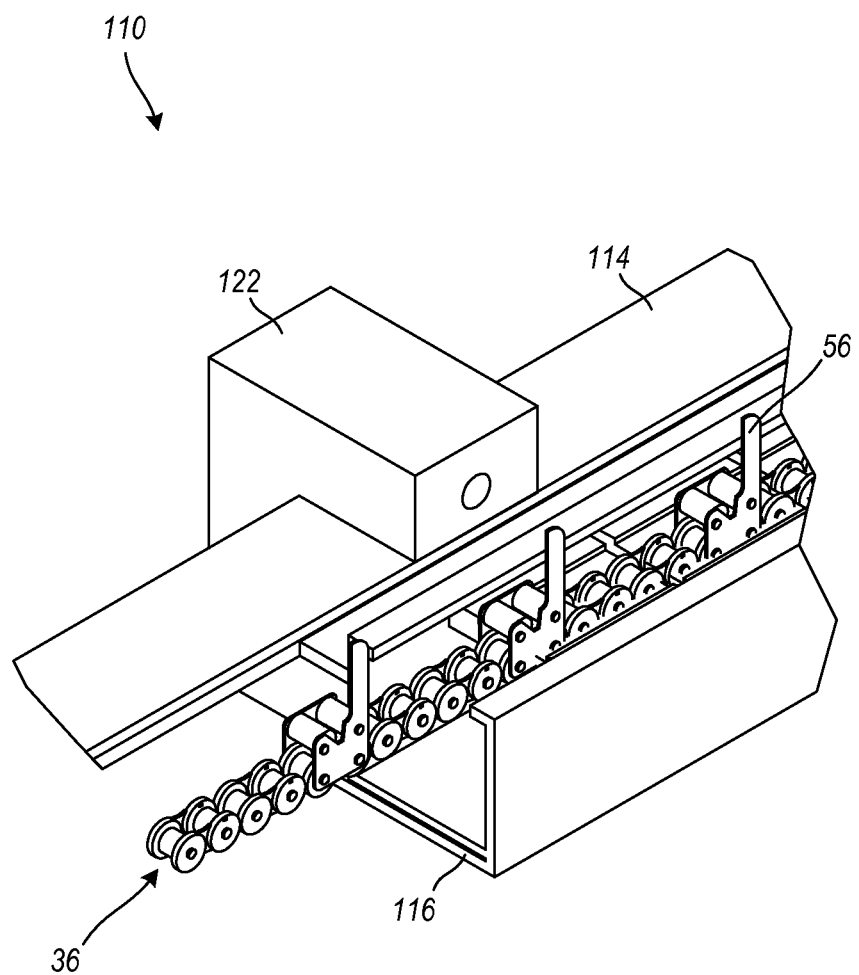
FIG. 18 is a close-up front perspective view of the broiler conveyor chain assembly depicted in FIG. 15.
Figure 19:
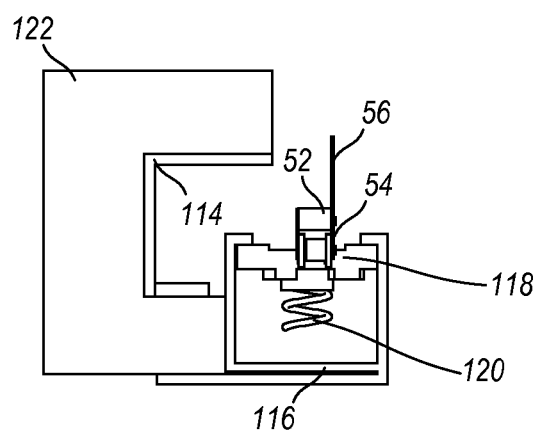
FIG. 19 is an end planar view of the broiler conveyor chain assembly depicted in FIG. 15.
Figure 20:
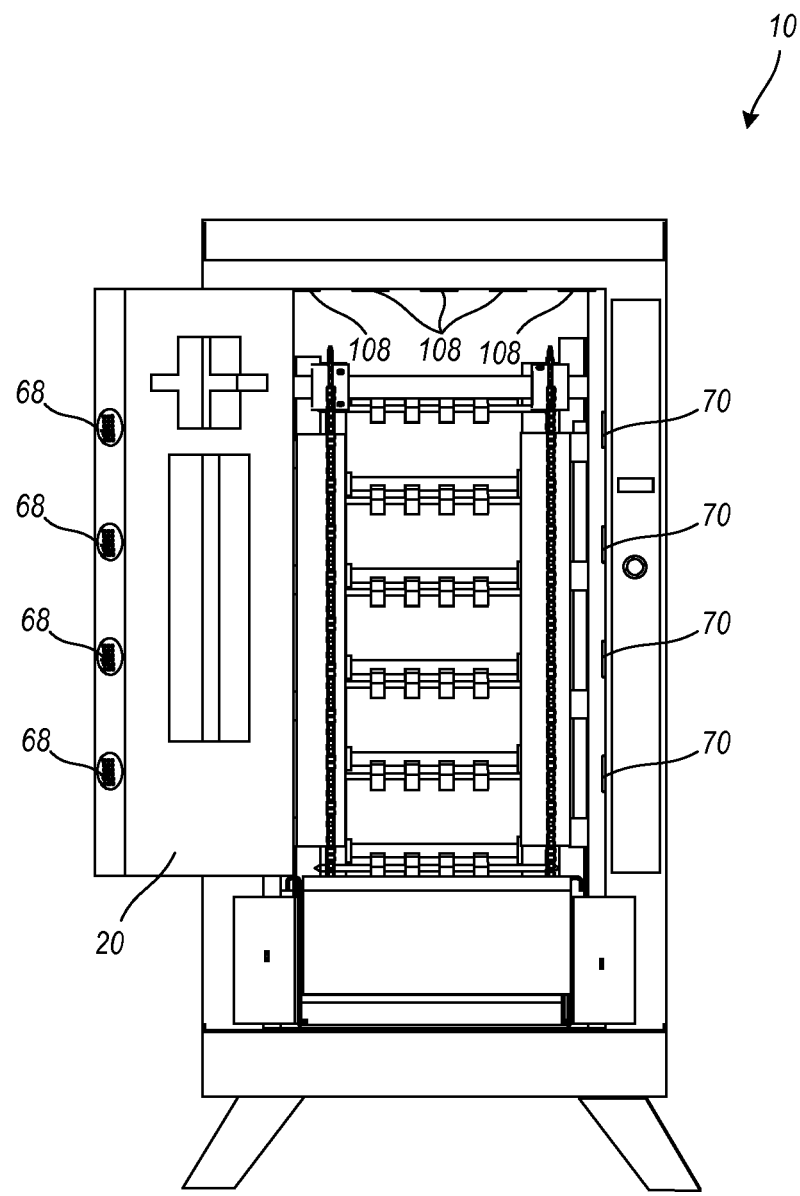
FIG. 20 is a front planar view of a rotisserie broiler, illustrating, in particular, the ventilation system, according to an embodiment of the technology described herein.
Figure 21:
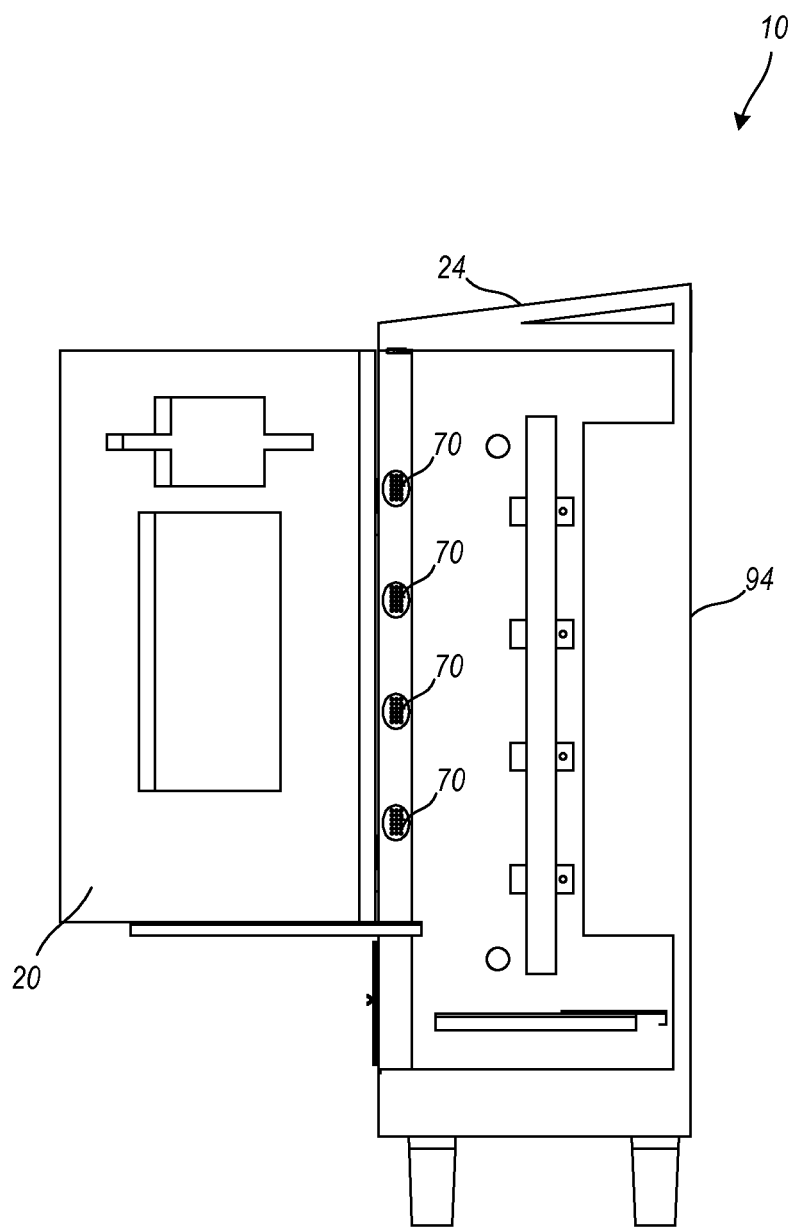
FIG. 21 is a side cross sectional view of the rotisserie broiler depicted in FIG. 20.
Figure 22:
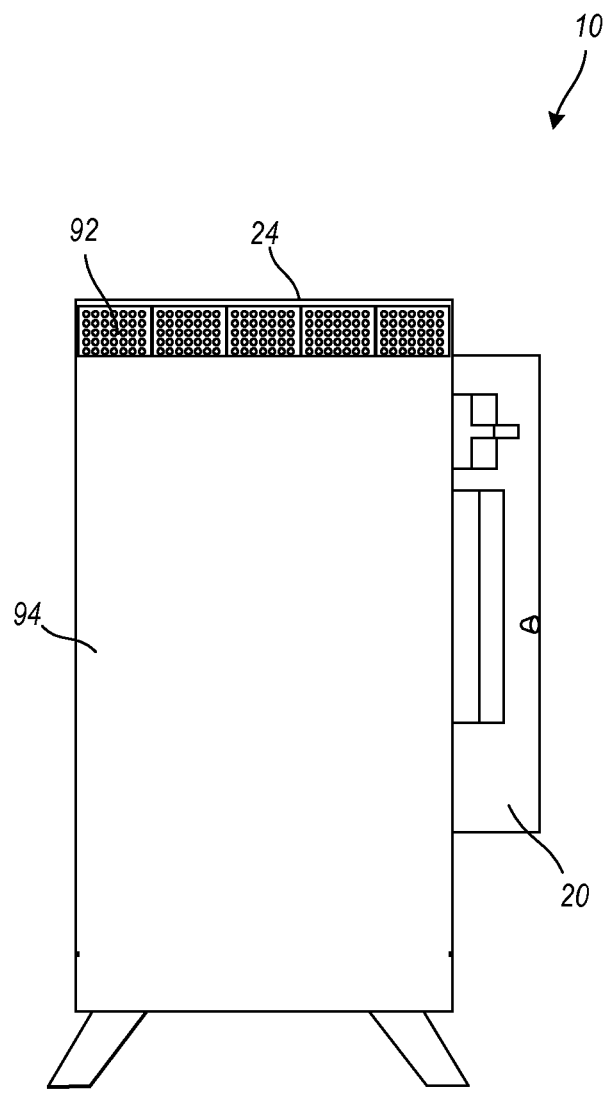
FIG. 22 is a rear view of the rotisserie broiler depicted in FIG. 20.
Figure 23:
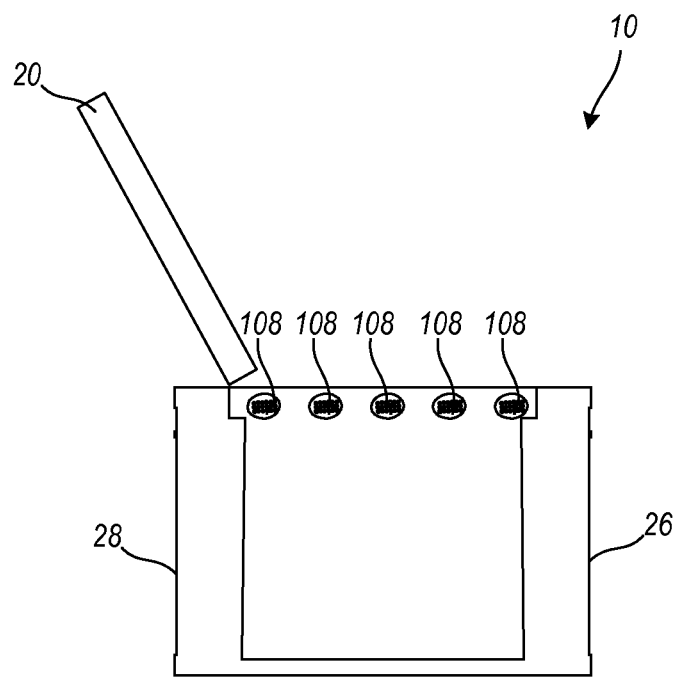
FIG. 23 is a section view of the rotisserie broiler depicted in FIG. 20 from the side looking upwardly at the interior top and top vents.
Figure 24:
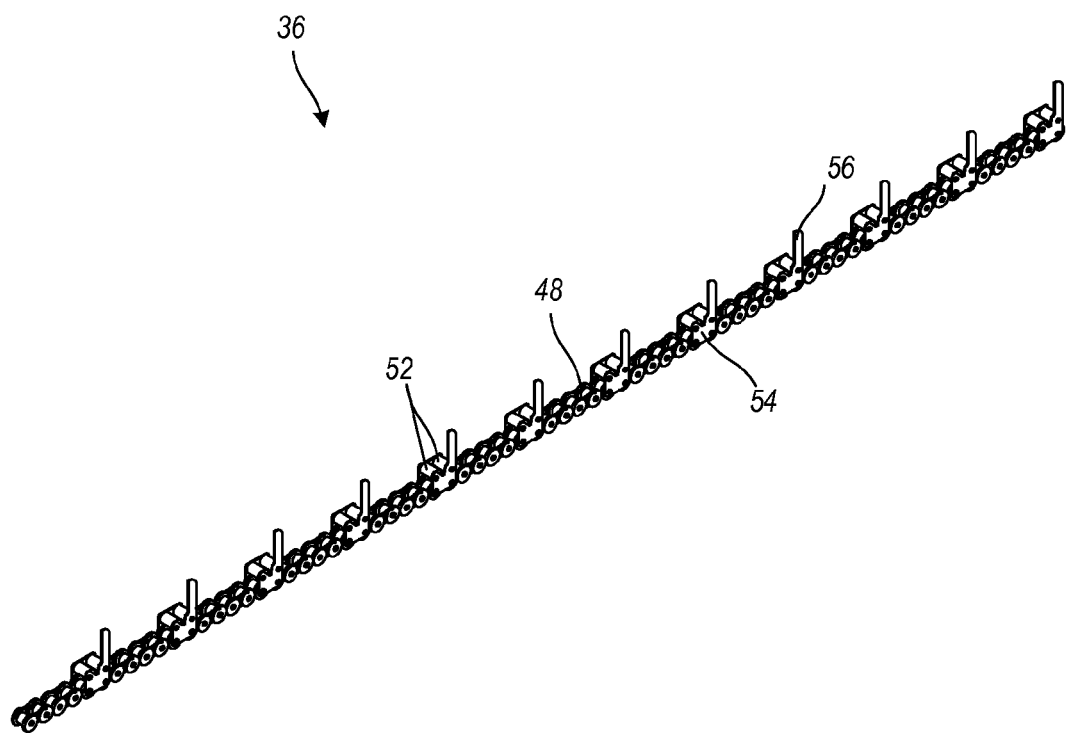
FIG. 24 is a front perspective view of the chain assembly for the vertical conveyor, according to an embodiment of the technology described herein.
Figure 25:
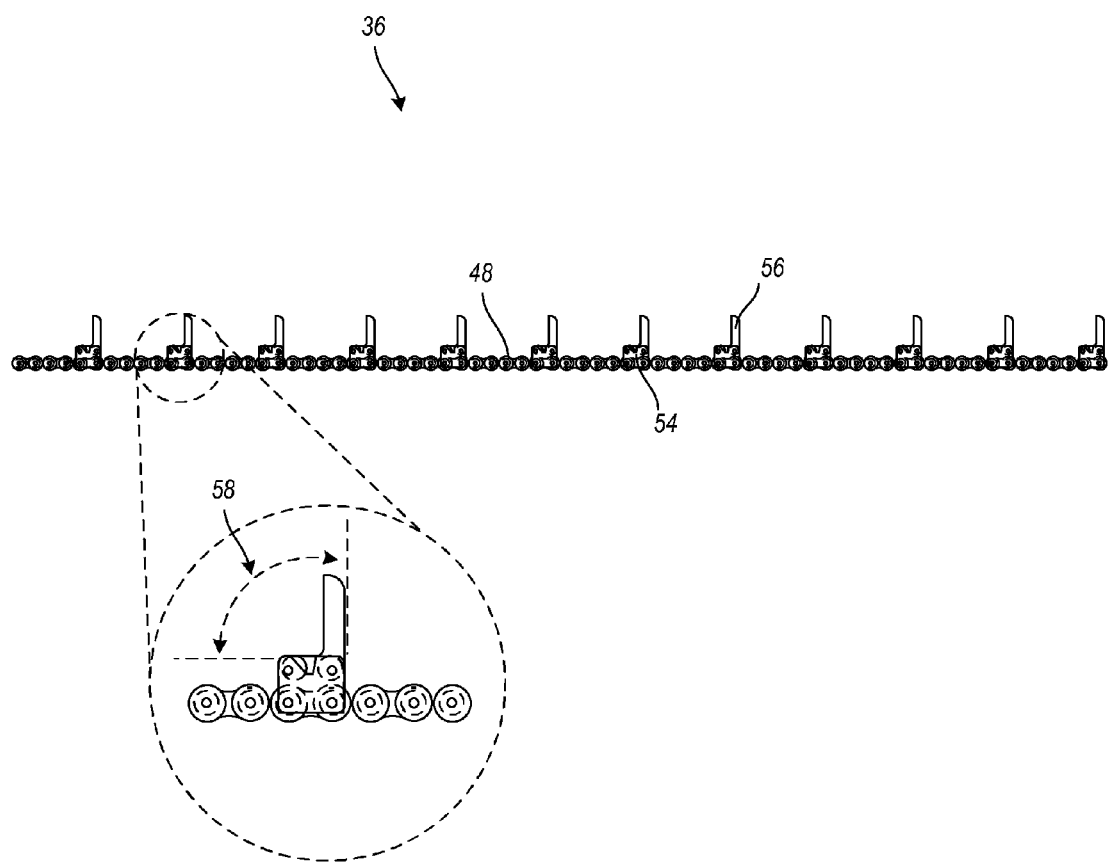
FIG. 25 is a side planar view of the chain depicted in FIG. 24.
Figure 26:
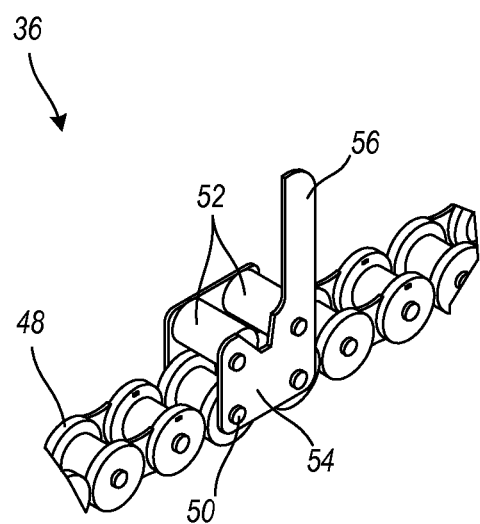
FIG. 26 is a close-up front perspective view of a few chain links of the chain assembly depicted in FIG. 24.
Figure 27:
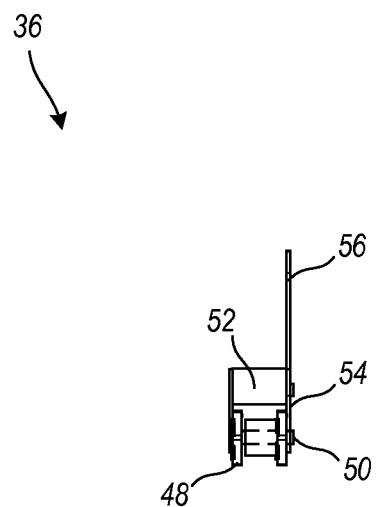
FIG. 27 is an end view of the chain depicted in FIG. 24.
Figure 28:
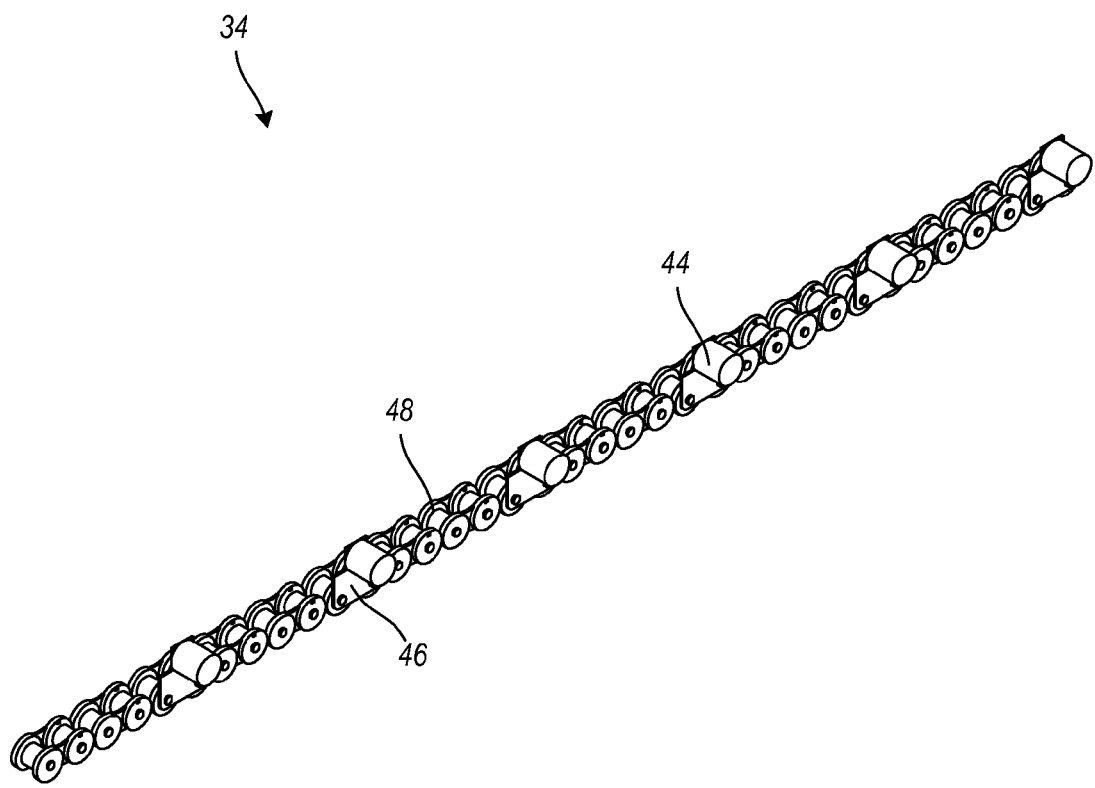
FIG. 28 is a front perspective view of the feeder pan chain assembly for the horizontal conveyor, according to an embodiment of the technology described herein.
Figure 29:
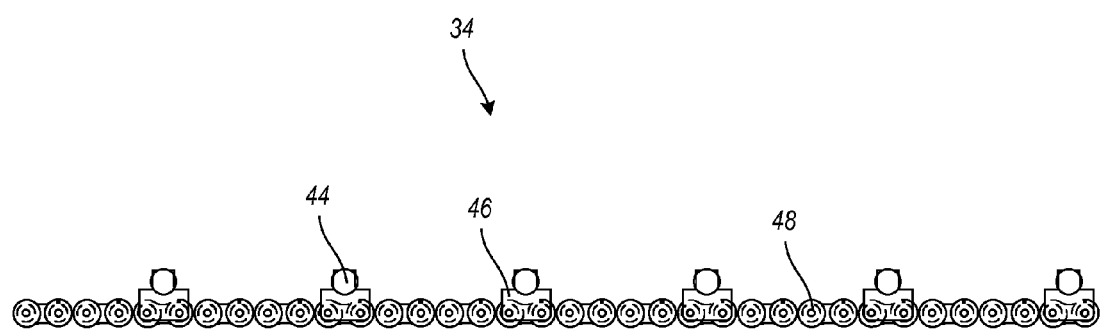
FIG. 29 is a side planar view of the chain depicted in FIG. 28.
Figure 30:
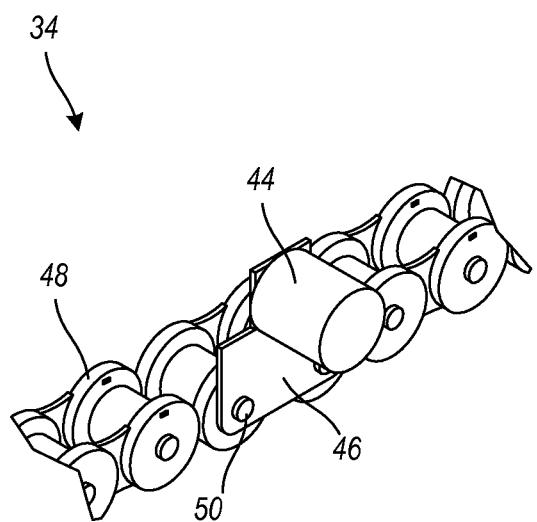
FIG. 30 is a close-up front perspective view of a few chain links of the chain assembly depicted in FIG. 28.
Figure 31:
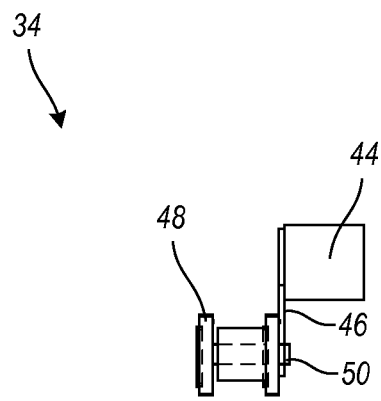
FIG. 31 is an end view of the chain depicted in FIG. 28.

The rotisserie broiler 10 includes a rocker arm assembly 96 and tension spring 98. The rocker arm assembly 96 maintains the rotisserie chain assemblies 36 in a taut circuitous path. As depicted specifically in FIG. 9, a rocker arm assembly 96 and a tension spring 98 are utilized on lower axle 100. The rocker arm assembly 96 and tension spring 98 can be located in a side panel such as panel 26 with access, for example, to the lower axle 100. Additionally this access point can provides a grease fitting 104. In use, a rocker arm assembly 96 is utilized in each side panel 26, 28, to keep each of the rotisserie chain assemblies 36 in a taut circuitous path. This ensures each rotisserie chain is taut and properly conveys a skewered food product 32.

The rotisserie broiler 10 includes a central bus for power and at least one motor to drive the chain assemblies 34, 36. The motor and central bus (not shown) are placed with a housing panel member of the rotisserie broiler 10.

The rotisserie broiler 10 includes a removable feeder pan assembly 12. The feeder pan 12 is manufactured of a non-stick, easy-clean surface, such as Teflon® in at least one embodiment. As depicted specifically in FIGS. 10 through 14, the parallel pair of feeder chain assemblies 34 of the horizontal conveyor assembly can be placed with the feeder pan 34 for operation. The feeder pan 12 can be moved in and out of the rotisserie broiler 10 by an operator. The feeder pan 12 is the entry location to the rotisserie broiler 10 in which the skewered food items 32 are placed for heating and cooking. The feeder pan 12 is placed above the base panel 30 and below the door 20. Insertion of the feeder pan 12 is guided by fins 86 which indicate a stop location.

The feeder pan 12 includes a base pan 88. The base pan 88 can collect any drippings or the like from the skewered food items 32 as they are conveyed and rotated through the rotisserie broiler 10. The base pan 88 as well as the entire feeder pan 12, can be easily removed for cleaning and washing.

The feeder pan 12 includes a multiplicity of handle and track areas. As depicted specifically in FIG. 10, feeder pan 12 includes an upper handle 74 and lower handle 76. An operator can grasp the feeder pan 12 by the upper handle 74 and the lower handle 76 to retract or insert the feeder pan 12. Upper left track 78 and lower left track 82 can provide for alignment on the left side as the feeder pan is placed into the rotisserie broiler 10. Upper right track 80 and lower right track 84 can provide for alignment on the right side as the feeder pan is placed into the rotisserie broiler 10. As will be apparent to one in the art, upon reading this disclosure, the numbers and locations of handles or tracks on the feeder pan 12 can be varied.

Referring now specifically to FIGS. 15 through 19, a tension bar assembly 110 is depicted. The tension bar assembly 110 is utilized to provide a pressure to each rotisserie chain assembly 36. The tension bar assembly 110 includes a plurality of free-floating tension plates 118, each having a tension spring 120. Each tension plate 118 is pressed against the rotisserie chain assembly 36 with a tension. The tension to each tension plate 118 is provided by tension spring 120. The tension pad 118 and tension springs 120 are maintained in a channel 116 adapted to fit immediately behind each rotisserie chain assembly 36. The tension bar assembly 110 is protected by cover 114 and held in place by blocks 122. The cover 114 is provided, in part, to maintain NSF and UL compliance.

Referring now specifically to FIGS. 20 through 23, the ventilation and convection cooking system of the rotisserie broiler 10 is shown. As depicted best in FIG. 20, the door 20 includes multiple door air circulation vents 68 to provide for ventilation to keep the door 20 cool. Side panels 26, 28 each include multiple side wall air circulation vents 70 to provide ventilation and to keep the side walls cool. As depicted best in FIG. 23, top panel 24 include multiple vents 108 to provide ventilation and to keep the top wall cool. An upper section of the back panel 94 includes evacuation vents 92 to provide ventilation and to keep the top and back walls cool. Collectively, the vents 68, 70, 108, 92, provide for ventilation and convection cooking. Fans (not shown) are mounted in the base panel to create the convection air flow in the rotisserie broiler 10 in a continuous circuitous path. Additionally, the top panel 24 is configured at an angle to facilitate better air flow.

Referring now specifically to FIGS. 24 through 27, a rotisserie chain assembly 36 (the vertical chain) is shown. The rotisserie chain assembly 36 is comprised of a left and right chain each comprised of a plurality of chain links 48. Chain links 48 are configured for rotation around a gear, sprocket, or the like. Chain link 48 can be held together in linked formation via chain pin 50. In the rotisserie chain assembly 36 depicted, every few links is placed a double roller plate 54 about a double roller 52. Each double roller plate 54 is linked to a double roller 52, chain link 48, and chain pin 50. There is a double roller plate 54 on each side of the chain link 48 where a double plate occurs. On one side, the double roller plate 54 includes lift arm 56. The lift arm 56 is configured to provide lift to an end of a skewer on the vertical conveyor. As depicted specifically in FIG. 24, the lift arm 56 is placed at an angle 58 to the chain that is approximately ninety degrees. It will be apparent to one of ordinary skill in the art upon reading this disclosure that the angle 58 can vary; however, tests conducted have shown that the ninety degree angle is preferable. The double rollers 52 and lift arms 56 provide a means by which the skewer 32 is lifted and progress along the vertical path. The double rollers 52 and lift arms 56 on a left rotisserie chain assembly 36 are symmetric and equally matched with double rollers 52 and lift arms 56 on a right rotisserie chain assembly 36. This symmetry ensures that the skewers 32 progress evenly through the rotisserie broiler 10.

Referring now specifically to FIGS. 28 through 31, a feeder pan chain assembly 34 (the horizontal chain assembly) is shown. The feeder pan chain assembly 34 is comprised of a left and right chain and a plurality of chain links 48. Chain links 48 are configured for rotation around a gear, sprocket, or the like. Chain link 48 can be held together in linked formation via chain pin 50. In the feeder pan chain assembly 34 depicted, every few links is placed a single roller plate 46 about a single roller 44. Each single roller plate 46 is linked to a single roller 44, chain link 48, and chain pin 50. The feeder pan chain assembly 34 provides a means by which skewers 32 containing food items to be heated and cooked are placed in motion to be conveyed to a vertical conveyor and then past heating elements 42 for heating, cooking, dispersion. The single rollers 44 provide a means by which the skewer 32 is pushed along. The single rollers 44 on one feeder pan chain assembly 34 are symmetric and equally matched with single rollers 44 on a parallel feeder pan chain assembly 34. This symmetry ensures that the skewers 32 progress evenly through the rotisserie broiler 10.

Although this technology has been illustrated and described herein with reference to preferred embodiments and specific examples thereof, it will be readily apparent to those of ordinary skill in the art that other embodiments and examples can perform similar functions and/or achieve like results. All such equivalent embodiments and examples are within the spirit and scope of the invention and are intended to be covered by the following claims.

What is claimed is:

1. A heating and cooking apparatus for skewered food items, the apparatus comprising:
   a horizontal conveyor assembly defining a horizontal path of travel between a skewer receiving area and a transfer channel, the horizontal conveyor assembly having a parallel pair of feeder chain assemblies to endlessly convey at a same rate to the transfer channel;
   a vertical conveyor assembly disposed perpendicular to the horizontal conveyor assembly at the transfer channel and defining a vertical path of travel between the transfer channel and a dispenser, the vertical conveyor assembly having a parallel pair of rotisserie chain assemblies to endlessly convey at the same rate from the transfer channel to the dispenser; and
   at least one serrated bar disposed vertically in the heating and cooking apparatus directly adjacent to the vertical conveyor assembly and the vertical path of travel between the transfer channel and the dispenser, wherein the at least one serrated bar is adapted to rotate a skewer pushed against it by the rotisserie chain assemblies while in transit on the vertical path to the dispenser.

2. The apparatus of claim 1, further comprising:
   a removable feeder pan assembly into which the horizontal conveyor assembly is disposed, the feeder pan assembly having a base pan and configured for operative removal and insertion from and into the heating and cooking apparatus, the feeder pan assembly having a curved chute defining the transfer channel and into which a skewered food item is transferred from the horizontal conveyor assembly to the vertical conveyor assembly.

3. The apparatus of claim 1, further comprising:
a pair of horizontal conveyor axles, each axle having a gear assembly at each end, the axles and gear assemblies configured to extend the parallel pair of feeder chain assemblies in a taut circuitous path between the skewer receiving area and the transfer channel.

4. The apparatus of claim 1, further comprising:
a pair of vertical conveyor axles, each axle having a gear assembly at each end, the axles and gear assemblies configured to extend the parallel pair of rotisserie chain assemblies in a taut circuitous path between the transfer channel and the dispenser.

5. The apparatus of claim 4, further comprising:
at least one rocker arm coupled to at least one vertical conveyor axle; and
at least one tension spring coupled to the rocker arm;
wherein the at least one rocker arm and the at least one tension spring are configured to maintain the rotisserie chain assemblies in a taut circuitous path between the transfer channel and the dispenser.

6. The apparatus of claim 1, further comprising:
a tension bar assembly disposed vertically in the rotisserie broiler directly adjacent to the rotisserie chain assemblies, the tension bar assembly having a plurality of free-floating tension plates each with a tension spring to push each tension plate against a back side of each rotisserie chain assembly to maintain a tension between a skewer on the vertical path and a serrated bar to rotate the skewer.

7. The apparatus of claim 1, further comprising:
at least one heating element disposed with the heating and cooking apparatus adjacent to the vertical path of travel and the vertical conveyor assembly to heat and cook a plurality of skewered food items.

8. The apparatus of claim 1, further comprising:
a ventilation system to keep a plurality of exterior walls of the heating and cooking apparatus cool and to provide convection cooking, the ventilation system having an at least one door air circulation vent, an at least one side wall air circulation vent, and an at least one back wall evacuation vent.

9. The apparatus of claim 1, further comprising:
a plurality of bar plates having lift arms disposed upon each rotisserie chain assembly to receive and lift an end of a skewer, wherein a first bar plate and lift arm on a left rotisserie chain assembly is symmetric in placement with a second bar plate and lift arm on a right rotisserie chain assembly.

10. The apparatus of claim 9, wherein each bar plate having a lift arm is defined with the lift arm at a generally ninety degree angle to a chain of the rotisserie chain assembly.

11. The apparatus of claim 7, wherein the heating element comprises a plurality of quartz bulbs.

12. The apparatus of claim 7, wherein the heating element comprises a plurality of cal-rod heating elements.

13. A rotisserie broiler comprising:
a horizontal conveyor assembly defining a horizontal path of travel between a skewer receiving area and a transfer channel, the horizontal conveyor assembly having a parallel pair of feeder chain assemblies to endlessly convey at a same rate to the transfer channel;
a removable feeder pan assembly into which the horizontal conveyor assembly is disposed, the feeder pan assembly having a base pan and configured for operative removal and insertion from and into the rotisserie broiler;
a vertical conveyor assembly disposed perpendicular to the horizontal conveyor assembly at the transfer channel and defining a vertical path of travel between the transfer channel and a dispenser, the vertical conveyor assembly having a parallel pair of rotisserie chain assemblies to endlessly convey at the same rate from the transfer channel to the dispenser; and
at least one serrated bar disposed vertically in the heating and cooking apparatus directly adjacent to the vertical conveyor assembly and the vertical path of travel between the transfer channel and the dispenser, wherein the at least one serrated bar is adapted to rotate a skewer pushed against it by the rotisserie chain assemblies while in transit on the vertical path to the dispenser.

14. The rotisserie broiler of claim 13, further comprising:
a curved chute defined within the feeder pan assembly into which a skewered food item is transferred from the horizontal conveyor assembly to the vertical conveyor assembly; and
at least one heating element disposed with the heating and cooking apparatus adjacent to the vertical path of travel and the vertical conveyor assembly to heat and cook a plurality of skewered food items.

15. The rotisserie broiler of claim 14, further comprising:
a first pair of axles, each axle having a gear assembly at each end, the axles and gear assemblies configured to extend the parallel pair of rotisserie chain assemblies in a taut circuitous path between the transfer channel and the dispenser; and
a second pair of axles, each axle having a gear assembly at each end, the axles and gear assemblies configured to extend the parallel pair of feeder chain assemblies in a taut circuitous path between the skewer receiving area and the transfer channel.

16. The rotisserie broiler of claim 14, further comprising:
a ventilation system to keep cool the plurality of exterior walls of the rotisserie broiler and to provide convection cooking, the ventilation system having at least one door air circulation vent, at least one side wall air circulation vent, and at least one back wall evacuation vent; and
a plurality of bar plates having lift arms disposed upon each rotisserie chain assembly to receive and lift an end of a skewer, wherein a first bar plate and lift arm on a left rotisserie chain assembly is symmetric in placement with a second bar plate and lift arm on a right rotisserie chain assembly, wherein each bar plate having a lift arm is defined with the lift arm at a generally ninety degree angle to the rotisserie chain assembly.

17. The rotisserie broiler of claim 14, further comprising:
a tension bar assembly disposed vertically in the rotisserie broiler directly adjacent to the rotisserie chain assemblies, the tension bar assembly having a plurality of free-floating tension plates each with a tension spring to push each tension plate against a back side of each rotisserie chain assembly to maintain a tension between a skewer on the vertical path and a serrated bar to rotate the skewer.

18. The rotisserie broiler of claim 14, further comprising:
at least one rocker arm coupled to at least one axle; and
at least one tension spring coupled to the rocker arm;
wherein the at least one rocker arm and the at least one tension spring are configured to maintain the rotisserie chain assemblies in a taut circuitous path between the transfer channel and the dispenser.

19. A rotisserie broiler system for heating and cooking skewered food items comprising:

a horizontal conveyor assembly defining a horizontal path of travel between a skewer receiving area and a transfer channel, the horizontal conveyor assembly having a parallel pair of feeder chain assemblies to endlessly convey at a same rate to the transfer channel;

a removable feeder pan assembly into which the horizontal conveyor assembly is disposed, the feeder pan assembly having a base pan and configured for operative removal and insertion from and into the rotisserie broiler;

a vertical conveyor assembly disposed perpendicular to the horizontal conveyor assembly at the transfer channel and defining a vertical path of travel between the transfer channel and a dispenser, the vertical conveyor assembly having a parallel pair of rotisserie chain assemblies to endlessly convey at the same rate from the transfer channel to the dispenser;

a curved chute defined within the feeder pan assembly into which a skewered food item is transferred from the horizontal conveyor assembly to the vertical conveyor assembly;

at least one heating element disposed with the heating and cooking apparatus adjacent to the vertical path of travel and the vertical conveyor assembly to heat and cook a plurality of skewered food items;

a first pair of axles, each axle having a gear assembly at each end, the axles and gear assemblies configured to extend the parallel pair of rotisserie chain assemblies in a taut circuitous path between the transfer channel and the dispenser;

a second pair of axles, each axle having a gear assembly at each end, the axles and gear assemblies configured to extend the parallel pair of feeder chain assemblies in a taut circuitous path between the skewer receiving area and the transfer channel;

a ventilation system to keep cool the plurality of exterior walls of the rotisserie broiler and to provide convection cooking, the ventilation system having at least one door air circulation vent, at least one side wall air circulation vent, and at least one back wall evacuation vent;

a plurality of bar plates having lift arms disposed upon each rotisserie chain assembly to receive and lift an end of a skewer, wherein a first bar plate and lift arm on a left rotisserie chain assembly is symmetric in placement with a second bar plate and lift arm on a right rotisserie chain assembly, wherein each bar plate having a lift arm is defined with the lift arm at a generally ninety degree angle to the rotisserie chain assembly;

a tension bar assembly disposed vertically in the rotisserie broiler directly adjacent to the rotisserie chain assemblies, the tension bar assembly having a plurality of free-floating tension plates each with a tension spring to push each tension plate against a back side of each rotisserie chain assembly to maintain a tension between a skewer on the vertical path and a serrated bar to rotate the skewer; and at least one rocker arm coupled to at least one axle having at least one tension spring coupled to the rocker arm, wherein the at least one rocker arm and the at least one tension spring are configured to maintain the rotisserie chain assemblies in a taut circuitous path between the transfer channel and the dispenser.

* * * * *